US010115528B2

(12) United States Patent
Abe

(10) Patent No.: US 10,115,528 B2
(45) Date of Patent: Oct. 30, 2018

(54) MULTILAYER CERAMIC ELECTRONIC COMPONENT

(71) Applicant: Murata Manufacturing Co., Ltd., Nagaokakyo-shi, Kyoto-fu (JP)

(72) Inventor: Hirotsugu Abe, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 10 days.

(21) Appl. No.: 15/389,569

(22) Filed: Dec. 23, 2016

(65) Prior Publication Data
US 2017/0186552 A1 Jun. 29, 2017

(30) Foreign Application Priority Data

Dec. 25, 2015 (JP) ................. 2015-253850

(51) Int. Cl.
| H01G 4/005 | (2006.01) |
| H01G 4/30 | (2006.01) |
| H01G 4/248 | (2006.01) |
| H01G 4/40 | (2006.01) |
| H01G 4/12 | (2006.01) |
| H01G 4/224 | (2006.01) |
| H01G 4/232 | (2006.01) |
| H01G 4/012 | (2006.01) |

(52) U.S. Cl.
CPC ............. *H01G 4/40* (2013.01); *H01G 4/005* (2013.01); *H01G 4/012* (2013.01); *H01G 4/12* (2013.01); *H01G 4/224* (2013.01); *H01G 4/232* (2013.01); *H01G 4/2325* (2013.01); *H01G 4/248* (2013.01); *H01G 4/30* (2013.01)

(58) Field of Classification Search
None
See application file for complete search history.

(56) References Cited

U.S. PATENT DOCUMENTS

| 4,584,074 A * | 4/1986 | Sterling ................. C25D 13/02 204/487 |
| 2013/0229749 A1 | 9/2013 | Lee et al. |
| 2014/0126110 A1 | 5/2014 | Kim et al. |
| 2014/0153154 A1 | 6/2014 | Choi et al. |
| 2015/0014035 A1* | 1/2015 | Park ....................... H01G 2/065 174/260 |
| 2015/0340155 A1* | 11/2015 | Fukunaga .............. H01G 4/012 361/301.4 |

(Continued)

FOREIGN PATENT DOCUMENTS

| JP | 06-275462 A | 9/1994 |
| JP | 2005-235976 A | 9/2005 |

(Continued)

*Primary Examiner* — Dion R Ferguson
(74) *Attorney, Agent, or Firm* — Keating & Bennett, LLP

(57) ABSTRACT

A multilayer ceramic electronic component includes a laminated body including dielectric layers and internal electrode layers, and first and second external electrodes. The laminated body further includes a first conductor layer, a first insulating coating layer, a second conductor layer, and a second insulating coating layer. The surface of the first conductor layer closer to a first end surface is partially connected to the first external electrode. The surface of the second conductor layer closer to a second end surface is partially connected to the second external electrode.

20 Claims, 14 Drawing Sheets

(56) References Cited

U.S. PATENT DOCUMENTS

2016/0027584 A1\* 1/2016 Hattori .................. H01G 4/232
                                                       361/301.4
2016/0233025 A1\* 8/2016 Masuda .................. H01G 4/00

FOREIGN PATENT DOCUMENTS

| JP | 2008-258481 A | 10/2008 |
|----|---------------|---------|
| JP | 2011-100834 A | 5/2011 |
| JP | 2012-227197 A | 11/2012 |
| JP | 2013-187537 A | 9/2013 |
| JP | 2014-093514 A | 5/2014 |
| JP | 2015-029142 A | 2/2015 |
| JP | 2015-038914 A | 2/2015 |

\* cited by examiner

MULTILAYER CERAMIC ELECTRONIC COMPONENT

CROSS REFERENCE TO RELATED APPLICATIONS

This application claims the benefit of priority to Japanese Patent Application No. 2015-253850 filed on Dec. 25, 2015. The entire contents of this application are hereby incorporated herein by reference.

BACKGROUND OF THE INVENTION

1. Field of the Invention

The present invention relates to a multilayer ceramic electronic component, and more particularly, to a small-size multilayer ceramic electronic component.

2. Description of the Related Art

Japanese Patent Application Laid-Open No. 2015-29142 discloses a multilayer ceramic electronic component with equivalent series inductance (ESL) reduced by reducing the loop composed of a current pathway, and a Q value increased by shortening the current pathway. The multilayer ceramic electronic component disclosed in Japanese Patent Application Laid-Open No. 2015-29142 has external electrodes provided on end surfaces of a ceramic main body, opposed in the shorter direction of the body.

With the progress of the reduction in size for multilayer ceramic electronic components, the distance between the external electrodes is short in the configuration of the multilayer ceramic electronic component disclosed in Japanese Patent Application Laid-Open No. 2015-29142, and there is thus a possibility that short circuit will be caused between the external electrodes in the manufacture of the multilayer ceramic electronic component, or in the mounting of the multilayer ceramic electronic component.

SUMMARY OF THE INVENTION

Preferred embodiments of the present invention provide a multilayer ceramic electronic component that prevents short circuits from being caused between external electrodes while reducing ESL and increasing a Q value.

A multilayer ceramic electronic component according to a preferred embodiment of the present invention includes a laminated body including multiple dielectric layers and multiple internal electrode layers laminated, and including a first principal surface and a second principal surface opposed in the laminating direction, a first side surface and a second side surface opposed in the width direction perpendicular or substantially perpendicular to the laminating direction, and a first end surface and a second end surface opposed in the length direction perpendicular or substantially perpendicular to both the laminating direction and the width direction; a first external electrode provided on the first end surface; and a second external electrode provided on the second end surface. The multiple internal electrode layers include multiple first internal electrode layers electrically connected to the first external electrode; and multiple second internal electrode layers electrically connected to the second external electrode. The laminated body further includes a first conductor layer extending along the first side surface, which is connected to respective ends of the multiple first internal electrode layers closer to the first side surface to connect the multiple first internal electrode layers to each other; a first insulating coating layer covering a surface of the first conductor layer which is opposite to the side of the first conductor layer connected to the multiple first internal electrode layers to define the first side surface; the surface of the first conductor layer closer to the first end surface is partially connected to the first external electrode; a second conductor layer extending along the second side surface, which is connected to respective ends of multiple second internal electrode layers closer to the second side surface to connect the multiple second internal electrode layers to each other; a second insulating coating layer covering a surface on the side opposite to the side of the second conductor layer connected to the multiple second internal electrode layers to define the second side surface; and the surface of the second conductor layer closer to the second end surface is partially connected to the second external electrode.

A multilayer ceramic electronic component according to a preferred embodiment of the present invention includes a laminated body including multiple dielectric layers and multiple internal electrode layers laminated, and including a first principal surface and a second principal surface opposed in the laminating direction, a first side surface and a second side surface opposed in the width direction perpendicular or substantially perpendicular to the laminating direction, and a first end surface and a second end surface opposed in the length direction perpendicular or substantially perpendicular to both the laminating direction and the width direction; a first external electrode provided on the first end surface; and a second external electrode provided on the second end surface. The multiple internal electrode layers include multiple first internal electrode layers electrically connected to the first external electrode; and multiple second internal electrode layers electrically connected to the second external electrode. The laminated body further includes a first insulating coating layer covering respective ends of the multiple first internal electrode layers closer to the first side surface to define the first side surface; and a second insulating coating layer covering respective ends of the multiple second internal electrode layers closer to the second side surface to define the second side surface. A portion of the multiple first internal electrode layers, which is closer to the first end surface at the end closer to the first side surface for each of the multiple first internal electrode layers, is connected to the first external electrode. A portion of the multiple second internal electrode layers, which is closer to the second end surface at the end closer to the second side surface for each of the multiple second internal electrode layers, is connected to the second external electrode.

According to a preferred embodiment of the present invention, the multilayer ceramic electronic component preferably has an outside dimension of about 0.48 mm or less in the length direction, and an outside dimension of about 0.24 mm or less in the width direction, for example.

According to a preferred embodiment of the present invention, the surface of the first conductor layer closer to the first end surface is partially covered with the first external electrode. The rest of the surface of the first conductor layer, other than the portion, is covered with the first insulating coating layer. The surface of the second conductor layer closer to the second end surface is partially covered with the second external electrode. The rest of the surface of the first conductor layer, other than the portion, is covered with the second insulating coating layer.

According to a preferred embodiment of the present invention, the respective ends of the multiple first internal electrode layers closer to the first end surface are partially covered with the first external electrode. The rest of the respective ends of the multiple first internal electrode layers, other than the portions, are covered with the first insulating coating layer. The respective ends of the multiple second internal electrode layers closer to the second end surface are partially covered with the second external electrode. The rest of the respective ends of the multiple second internal electrode layers, other than the portions, are covered with the second insulating coating layer.

According to a preferred embodiment of the present invention, the first conductor layer and the second conductor layer each include one metal selected from the group consisting of Ni, Cu, Ag, and Pd, or an alloy including the metal.

According to various preferred embodiments of the present invention, multilayer ceramic electronic components prevent short circuits from being caused between the external electrodes while reducing the ESL and increasing the Q value.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic electronic components according to respective preferred embodiments of the present invention will be described below with reference to the drawings. In the following descriptions of the preferred embodiments, like or corresponding portions in the figures are denoted by like symbols, but the descriptions of the portions will not be repeated. While multilayer ceramic capacitors will be described as the multilayer ceramic electronic components in the preferred embodiments, the multilayer ceramic electronic components may be multilayer ceramic inductors or the like.

Preferred Embodiment 1

Figure 1:
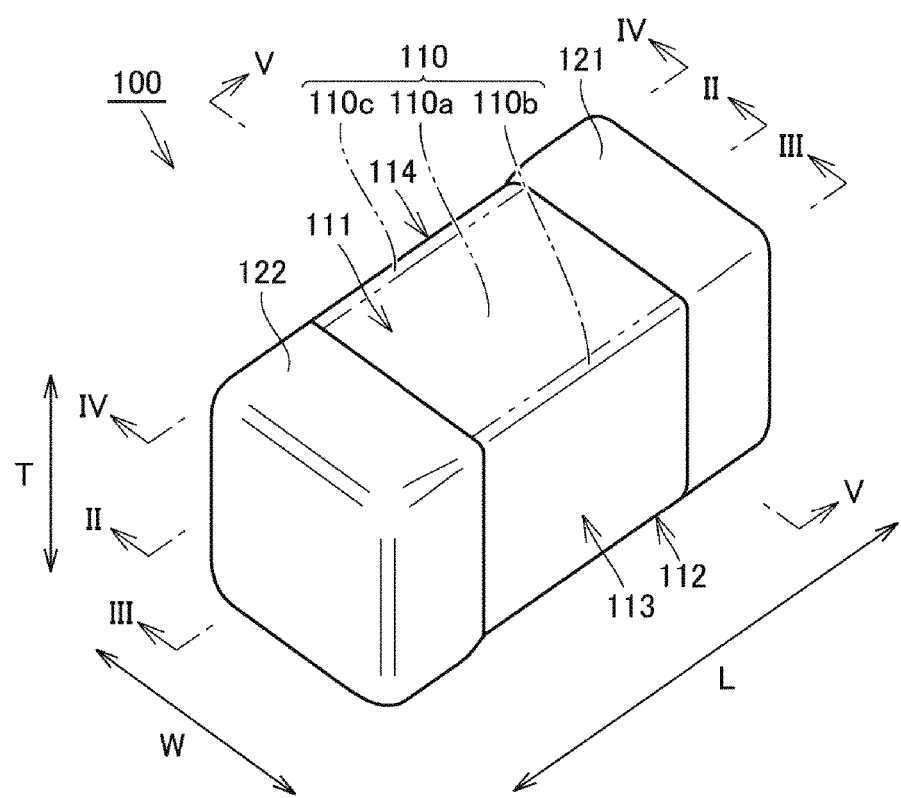
FIG. 1 is a perspective view illustrating the appearance of a multilayer ceramic electronic component according to Preferred Embodiment 1 of the present invention.
Figure 2:
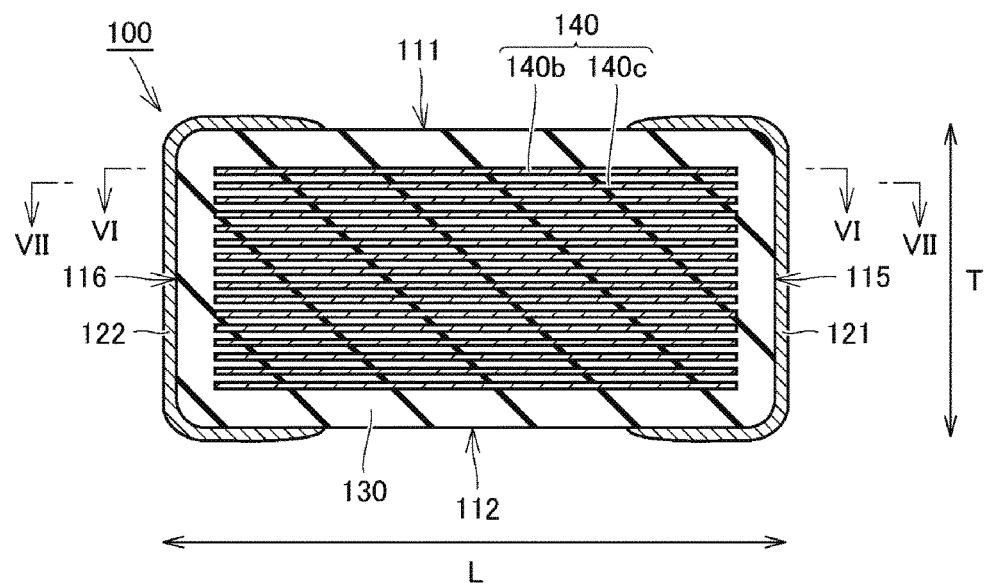
FIG. 2 is a cross-sectional view of the multilayer ceramic electronic component in FIG. 1 as viewed from the direction of II-II arrows.
Figure 3:
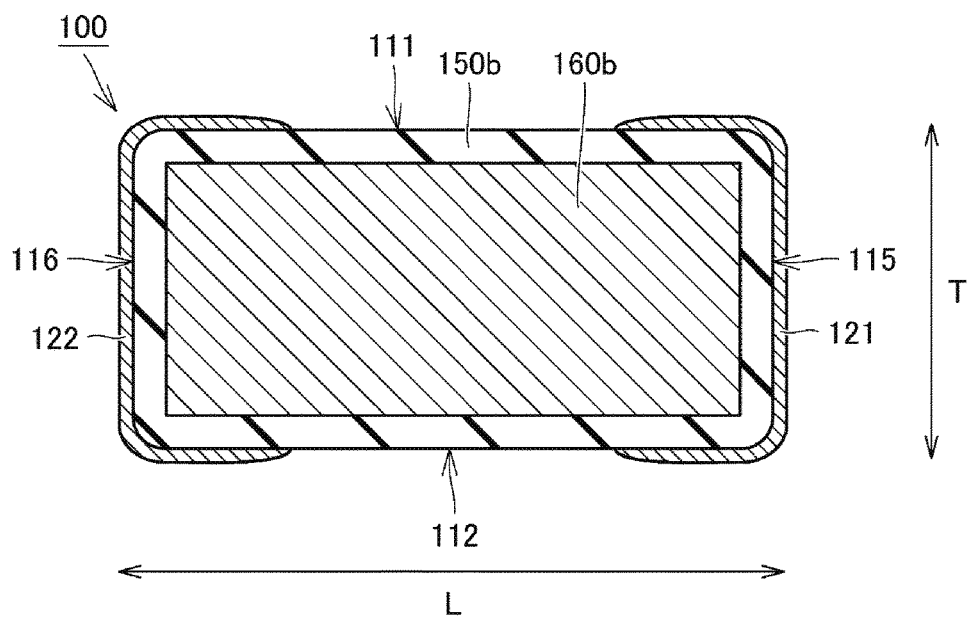
FIG. 3 is a cross-sectional view of the multilayer ceramic electronic component in FIG. 1 as viewed from the direction of III-III arrows.
Figure 4:
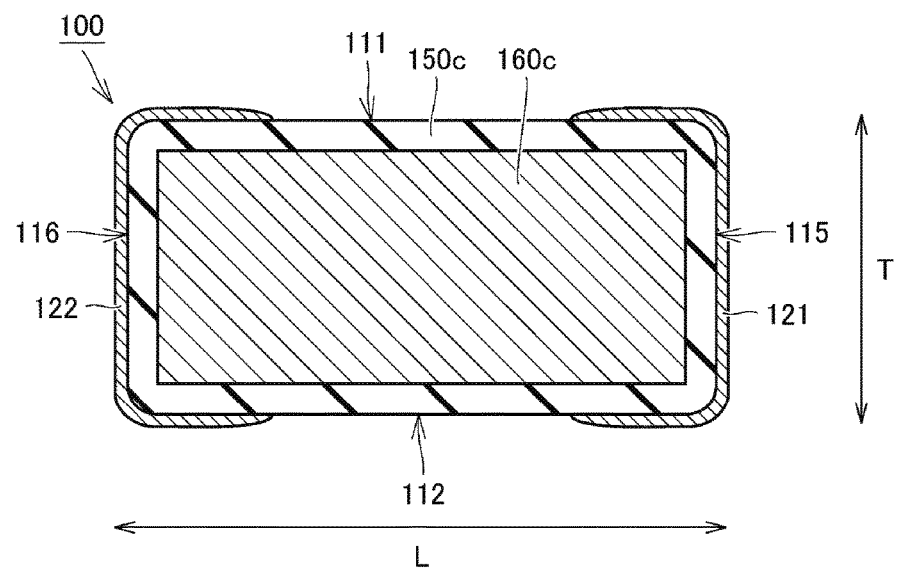
FIG. 4 is a cross-sectional view of the multilayer ceramic electronic component in FIG. 1 as viewed from the direction of IV-IV arrows.
Figure 5:
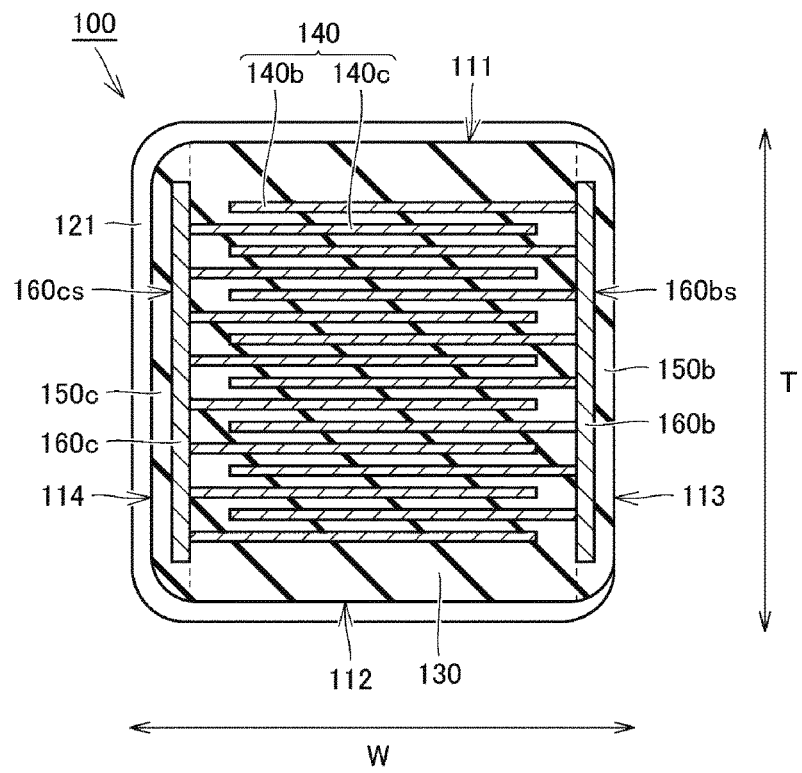
FIG. 5 is a cross-sectional view of the multilayer ceramic electronic component in FIG. 1 as viewed from the direction of V-V arrows.
Figure 6:
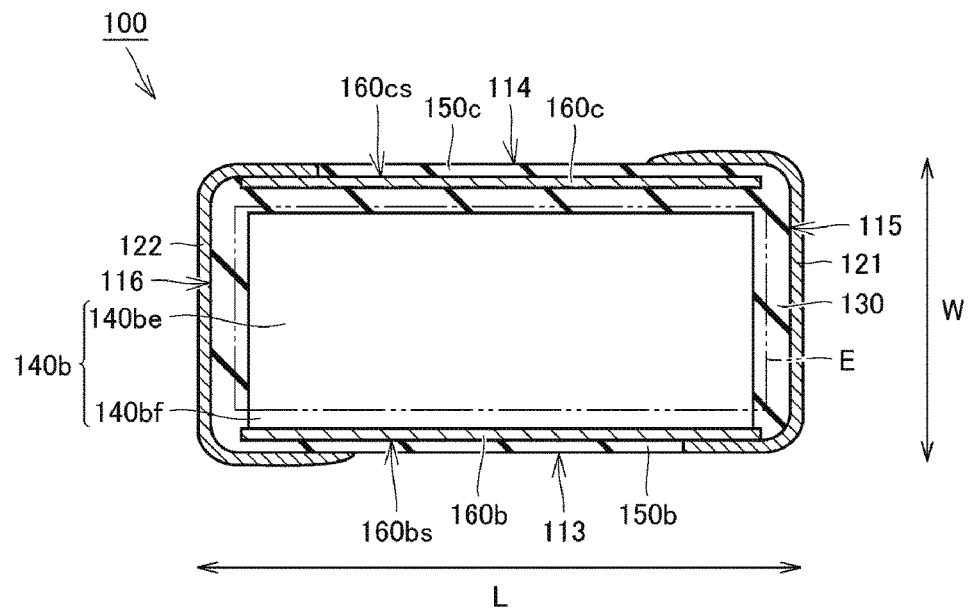
FIG. 6 is a cross-sectional view of the multilayer ceramic electronic component in FIG. 2 as viewed from the direction of VI-VI arrows.
Figure 7:
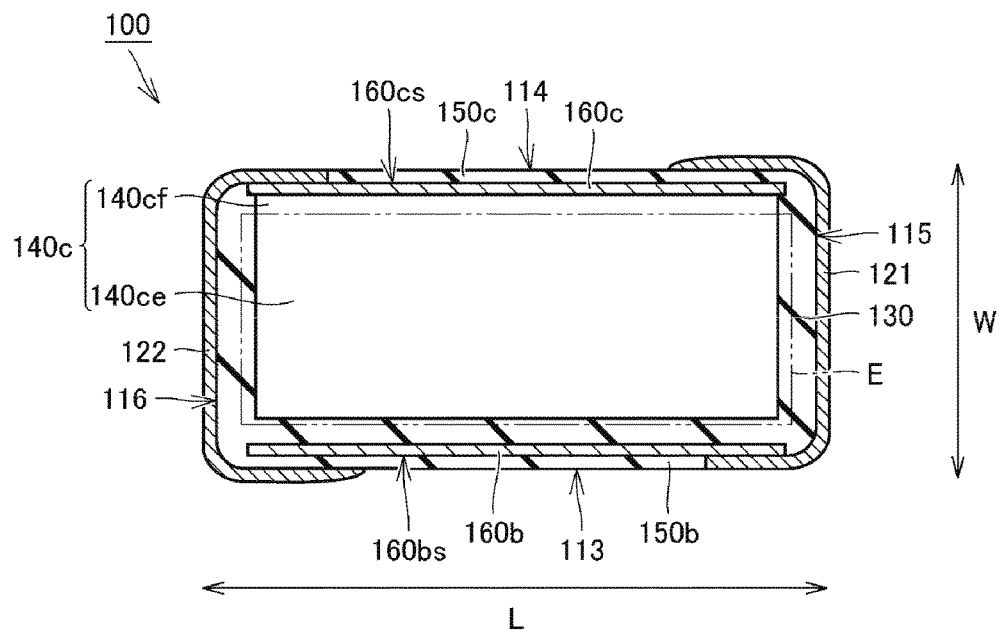
FIG. 7 is a cross-sectional view of the multilayer ceramic electronic component in FIG. 2 as viewed from the direction of VII-VII arrows.

FIG. 1 is a perspective view illustrating the appearance of a multilayer ceramic electronic component according to Preferred Embodiment 1 of the present invention. FIG. 2 is a cross-sectional view of the multilayer ceramic electronic component in FIG. 1 as viewed from the direction of II-II arrows. FIG. 3 is a cross-sectional view of the multilayer ceramic electronic component in FIG. 1 as viewed from the direction of III-III arrows. FIG. 4 is a cross-sectional view of the multilayer ceramic electronic component in FIG. 1 as viewed from the direction of IV-IV arrows. FIG. 5 is a cross-sectional view of the multilayer ceramic electronic component in FIG. 1 as viewed from the direction of V-V arrows. FIG. 6 is a cross-sectional view of the multilayer ceramic electronic component in FIG. 2 as viewed from the direction of VI-VI arrows. FIG. 7 is a cross-sectional view of the multilayer ceramic electronic component in FIG. 2 as viewed from the direction of VII-VII arrows. In FIGS. 1 to 7, as will be described later, the length direction of a laminated body, the width direction of the laminated body, and the laminating direction of the laminated body are respectively denoted by L, W, and T.

As shown in FIGS. 1 to 7, a multilayer ceramic electronic component 100 according to Preferred Embodiment 1 of the present invention includes a laminated body 110, a first external electrode 121, and a second external electrode 122.

The laminated body 110 preferably has a cuboid or substantially cuboid outer shape. The laminated body 110 includes multiple dielectric layers 130 and multiple internal electrode layers 140 laminated. The laminated body 110 includes a first principal surface 111 and a second principal surface 112 opposed in the laminating direction T, a first side surface 113 and a second side surface 114 opposed in the width direction W perpendicular or substantially perpendicular to the laminating direction T, and a first end surface 115 and a second end surface 116 opposed in the length direction L perpendicular or substantially perpendicular to both the laminating direction T and the width direction W.

The laminated body 110 preferably has the cuboid or substantially cuboid outer shape as mentioned above, but preferably have corners and ridges rounded. The corner refers to the intersection of three surfaces of the laminated body 110, and the ridge refers to the intersection of two surfaces of the laminated body 110. At least one of the first principal surface 111, second principal surface 112, first side surface 113, second side surface 114, first end surface 115, and second end surface 116 may include asperities.

According to a non-limiting example of the present preferred embodiment, the multilayer ceramic electronic component 100 preferably has an outside dimension of about 0.48 mm or less in the length direction L, and an outside dimension of about 0.24 mm or less in the width direction W. However, the outside dimensions of the multilayer ceramic electronic component 100 are not limited to the foregoing, but the outside dimension in the length direction L has only to be larger than the outside dimension in the width direction W. The outside dimensions can be measured by observing the multilayer ceramic electronic component 100 with a microscope.

The laminated body 110 includes a main portion 110a, a first coating portion 110b that coats one side surface of the main portion 110a to define the first side surface 113, and a second coating portion 110c that coats the other side surface of the main portion 110a to define the second side surface 114.

The laminated body 110 includes a first conductor layer 160b extending along the first side surface 113, which is connected to respective ends of multiple first internal electrode layers 140b closer to the first side surface 113 to connect the multiple first internal electrode layers 140b to each other; and a first insulating coating layer 150b covering a surface 160bs on the side opposite to the side of the first conductor layer 160b connected to the multiple first internal electrode layers 140b to define the first side surface 113. The first coating portion 110b includes the first conductor layer 160b and the first insulating coating layer 150b.

The laminated body 110 includes a second conductor layer 160c extending along the second side surface 114, which is connected to respective ends of multiple second internal electrode layers 140c closer to the second side surface 114 to connect the multiple second internal electrode layers 140c to each other; and a second insulating coating layer 150c covering a surface 160cs on the side opposite to the side of the second conductor layer 160c connected to the multiple second internal electrode layers 140c to define the second side surface 114. The second coating portion 110c includes the second conductor layer 160c and the second insulating coating layer 150c.

The first external electrode 121 is provided on the first end surface 115 of the laminated body 110. The second external electrode 122 is provided on the second end surface 116 of the laminated body 110.

The internal electrode layers 140 include the multiple first internal electrode layers 140b electrically connected to the first external electrode 121; and the multiple second internal electrode layers 140c electrically connected to the second external electrode 122.

A portion of the surface 160bs of the first conductor layer 160b, which is closer to the first end surface 115, is directly connected to the first external electrode 121. The entire surface 160bs of the first conductor layer 160b is covered with the first insulating coating layer 150b and the first external electrode 121. Specifically, the portion of the surface 160bs of the first conductor layer 160b, which is closer to the first end surface 115, is covered with the first external electrode 121. The rest of the surface 160bs of the first conductor layer 160b, other than the portion mentioned above, is covered with the first insulating coating layer 150b.

A portion of the surface 160cs of the second conductor layer 160c, which is closer to the second end surface 116, is directly connected to the second external electrode 122. The entire surface 160cs of the second conductor layer 160c is covered with the second insulating coating layer 150c and the second external electrode 122. Specifically, the portion of the surface 160cs of the second conductor layer 160c, which is closer to the second end surface 116, is covered with the second external electrode 122. The rest of the surface 160cs of the second conductor layer 160c, other than the portion mentioned above, is covered with the second insulating coating layer 150c.

The respective constituent elements will be described in detail below.

The multiple dielectric layers 130 are each preferably about 0.3 μm or more and about 10 μm or less in thickness, for example. Dielectric ceramics containing, as their main constituent, $BaTiO_3$, $CaTiO_3$, $SrTiO_3$, $CaZrO_3$, or the like can be used as a material constituting the dielectric layers 130. In addition, materials may be used where the main constituents include a Mn compound, a Mg compound, a Si compound, a Fe compound, a Cr compound, a Co compound, a Ni compound, an Al compound, a V compound, a rare-earth compound, or the like added thereto as an accessory constituent.

The number of multiple internal electrode layers 140 laminated is preferably 4 or more. The multiple internal electrode layers 140 are each preferably about 0.2 μm or more and about 2.0 μm or less in thickness, for example. The first internal electrode layers 140b and the second internal electrode layers 140c are each rectangular or substantially rectangular in a planar view. The first internal electrode layers 140b and the second internal electrode layers 140c are alternately disposed at regular intervals in the laminating direction T of the laminated body 110. In addition, the first internal electrode layers 140b and the second internal electrode layers 140c are opposed to each other with the dielectric layers 130 interposed therebetween.

As shown in FIGS. 6 and 7, a region where the first internal electrode layers 140b and the second internal electrode layers 140c are opposed to each other with the dielectric layers 130 interposed therebetween, thus providing electrostatic capacitance is referred to as an effective region E.

The first internal electrode layers 140b include, in a planar view, a first opposed electrode portion 140be located in the effective region E; and a first extended electrode portion 140bf extended from the first opposed electrode portion 140be toward the first side surface 113 of the laminated body 110, and connected to the first conductor layer 160b.

The second internal electrode layers 140c include, in a planar view, a second opposed electrode portion 140ce located in the effective region E; and a second extended electrode portion 140cf extended from the second opposed electrode portion 140ce toward the second side surface 114 of the laminated body 110, and connected to the second conductor layer 160c.

At least one metal selected from the group consisting of Ni, Cu, Ag, Pd, and Au, or an alloy containing the metal, for example, an alloy of Ag and Pd can be used as a material constituting the internal electrode layers 140. The internal electrode layers 140 may include dielectric grains of the same composition as the dielectric ceramic included in the dielectric layers 130.

The first external electrode 121 is provided over each of the first end surface 115, the first principal surface 111, the second principal surface 112, the first side surface 113, and the second side surface 114 of the laminated body 110. The second external electrode 122 is provided over each of the second end surface 116, the first principal surface 111, the second principal surface 112, the first side surface 113, and the second side surface 114 of the laminated body 110.

The first external electrode 121 and the second external electrode 122 each include a base electrode layer, and a plated layer disposed on the base electrode layer. The base electrode layer includes at least one of a baked layer, a resin layer, and a thin film layer. The base electrode layer is preferably about 10 µm or more and about 100 µm or less in thickness, for example.

The baked layer includes glass and a metal. At least one metal selected from the group consisting of Ni, Cu, Ag, Pd, and Au, or an alloy containing the metal, for example, an alloy of Ag and Pd can be used as a material constituting the baked layer. The baked layer may be composed of multiple layers laminated. The baked layer may be a layer obtained by applying a conductive paste to the laminated body 110 and baking the paste, or a layer subjected to co-firing with the internal electrode layers 140.

The resin layer includes conductive particles and a thermosetting resin. When the resin layer is provided, the resin layer may be provided directly on the laminated body 110 without providing any baked layer. The resin layer may include multiple layers laminated. The resin layer is preferably about 10 µm or more and about 150 µm or less in thickness, for example.

The thin film layer preferably is formed by a thin-film formation method such as a sputtering method or a vapor deposition method. The thin film layer is a layer with a thickness of about 1 µm or less that has metal particles deposited, for example.

At least one metal selected from the group consisting of Ni, Cu, Ag, Pd, and Au, or an alloy containing the metal, for example, an alloy of Ag and Pd can be used as a material constituting the plated layer.

The plated layer may include multiple layers laminated. In this case, the plated layer preferably has a two-layer structure with a Sn plated layer provided on a Ni plated layer. The Ni plated layer prevents the base electrode layer from being eroded by solder used to mount the ceramic electronic component. The Sn plated layer improves the wettability to the solder used to mount the ceramic electronic component, thus making it easy to mount the ceramic electronic component. The plated layers are preferably about 1.0 µm or more and about 10.0 µm or less in thickness per layer.

The first conductor layer 160b and the second conductor layer 160c are each rectangular or substantially rectangular in a side view. The first conductor layer 160b and the second conductor layer 160c are each preferably about 0.2 µm or more and about 2.0 µm or less in thickness, for example. At least one metal selected from the group consisting of Ni, Cu, Ag, Pd, and Au, or an alloy containing the metal, for example, an alloy of Ag and Pd can be used as a material constituting each of the first conductor layer 160b and second conductor layer 160c. The first conductor layer 160b and the second conductor layer 160c each may include dielectric grains of the same composition as the dielectric ceramic included in the dielectric layers 130.

The first insulating coating layer 150b and the second insulating coating layer 150c are each preferably about 0.5 µm or more and about 10 µm or less in thickness, for example. Dielectric ceramics containing, as their main constituent, $BaTiO_3$, $CaTiO_3$, $SrTiO_3$, $CaZrO_3$, or the like can be used as a material constituting each of the first insulating coating layer 150b and second insulating coating layer 150c. In addition, materials may be used where the main constituents have a Mn compound, a Mg compound, a Si compound, a Fe compound, a Cr compound, a Co compound, a Ni compound, an Al compound, a V compound, a rare-earth compound, or the like added thereto as an accessory constituent.

Figure 8:
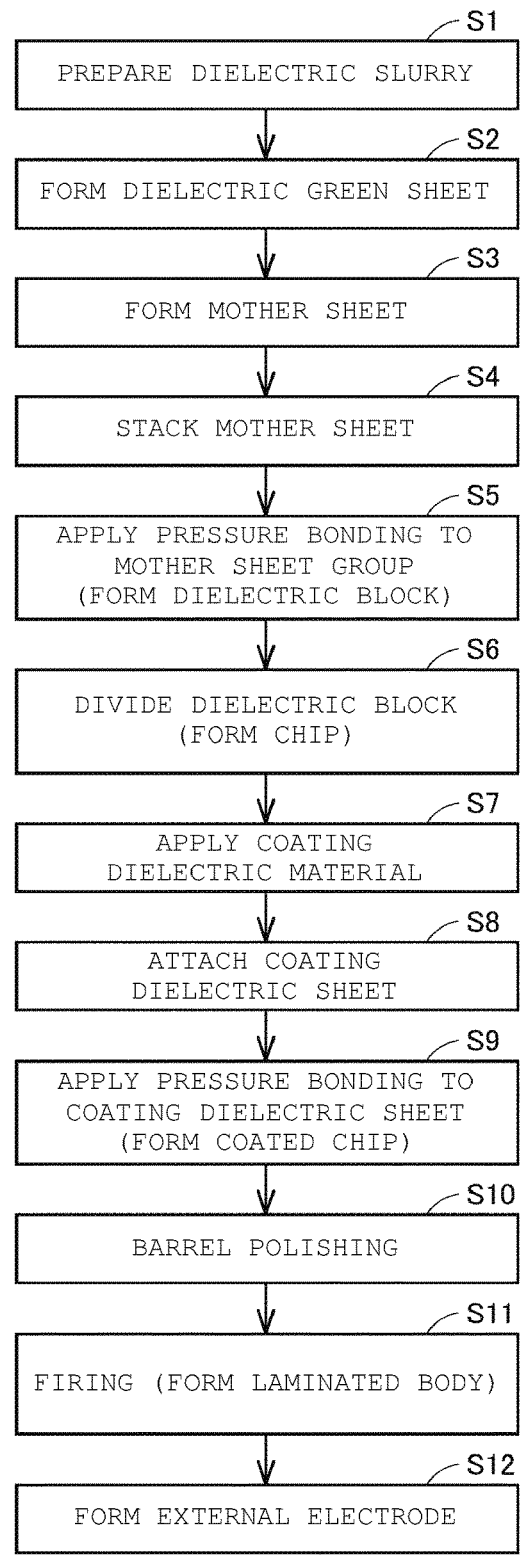
FIG. 8 is a flow diagram showing a method for manufacturing the ceramic electronic component according to Preferred Embodiment 1 of the present invention.

A non-limiting example of a method for manufacturing a ceramic electronic component according to Preferred Embodiment 1 of the present invention the will be described below with reference to the drawings. FIG. 8 is a flow diagram showing a method for manufacturing the ceramic electronic component according to Preferred Embodiment 1 of the present invention.

As shown in FIG. 8, for manufacturing the multilayer ceramic electronic component 100 according to Preferred Embodiment 1 of the present invention, first, dielectric slurry is prepared (step S1). Specifically, a dielectric powder, an additive powder, a binder resin, a dissolution liquid, and the like are dispersed and mixed, thus preparing dielectric slurry. The dielectric slurry may be solvent-based or water-based slurry. When the dielectric slurry is made a water-based coating, the dielectric slurry is prepared by mixing a water-soluble binder, a dispersant, and a dielectric raw material dissolved in water.

Next, dielectric green sheets are formed (step S2). Specifically, the dielectric slurry is formed, on a carrier film, into a sheet with the use of a die coater, a gravure coater, or the like, and dried, thus forming dielectric green sheets.

Next, mother sheets are formed (step S3). Specifically, a conductive paste is applied to the dielectric green sheets with the use of an ink-jet method, a screen printing method, a gravure printing method, or the like so as to provide predetermined patterns, thus forming mother sheets with predetermined conductive patterns on the dielectric green sheets. Further, as mother sheets, the dielectric green sheets obtained without undergoing the step S3 are also prepared in addition to the mother sheets with the conductive patterns.

Figure 9:
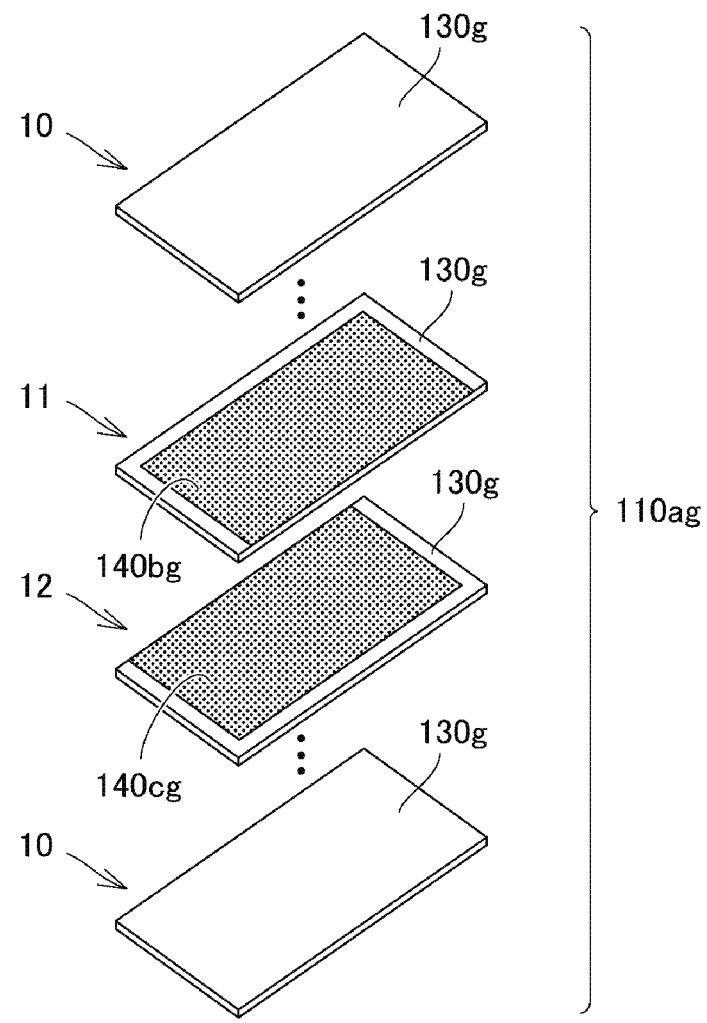
FIG. 9 is an exploded perspective view illustrating the laminated structure of a chip as a main portion of the ceramic electronic component according to Preferred Embodiment 1 of the present invention.

In this regard, the mother sheets formed will be described. FIG. 9 is an exploded perspective view illustrating the laminated structure of a chip as a main portion of the ceramic electronic component according to Preferred Embodiment 1 of the present invention. FIG. 9 shows therein only a portion corresponding to one chip 110*ag* in a group of mother sheets.

As shown in FIGS. 8 and 9, multiple mother sheets 10, 11, 12 are stacked (step S4). Specifically, a predetermined number of mother sheets 10 is stacked which are each composed of only a dielectric green sheet 130*g* without any conductive pattern formed thereon. The mother sheets 12 that each have a second conductive pattern 140*cg* for the second internal electrode layers 140*c* in a matrix form on a dielectric green sheet 130*g*, and the mother sheets 11 that each have a first conductive pattern 140*bg* for the first internal electrode layers 140*b* in a matrix form on a dielectric green sheet 130*g* are alternately formed thereon to reach predetermined numbers of sheets. Furthermore, a predetermined number of mother sheets 10 is stacked thereon which are each composed of only a dielectric green sheet 130*g* without any conductive pattern formed.

Thus, a group of mother sheets is configured.

Next, the group of mother sheets is subjected to pressure bonding, thus forming a dielectric block (step S5). Specifically, the group of mother sheets is subjected to pressure bonding by applying a pressure to the group in the stacking direction through isostatic press or rigid press.

Next, the dielectric block is divided to form chips 110*ag* (step S6). Specifically, the dielectric block is divided into a matrix form by cutting by pushing, or cutting with a dicing machine, thus providing a plurality of individual chips 110*ag*.

In the step S6 mentioned above, the dielectric block is cut such that the first conductive patterns 140*bg* have ends exposed at one side surface of the chip 110*ag*, whereas the second conductive patterns 140*cg* have ends exposed at the other side surface of the chip 110*ag*.

The ends of the multiple first conductive patterns 140*bg* closer to one side surface of each chip 110*ag* are aligned so as to overlap in the laminating direction T. The ends of the multiple second conductive patterns 140*cg* closer to the other side surface of each chip 110*ag* are aligned so as to overlap in the laminating direction T.

Figure 10:
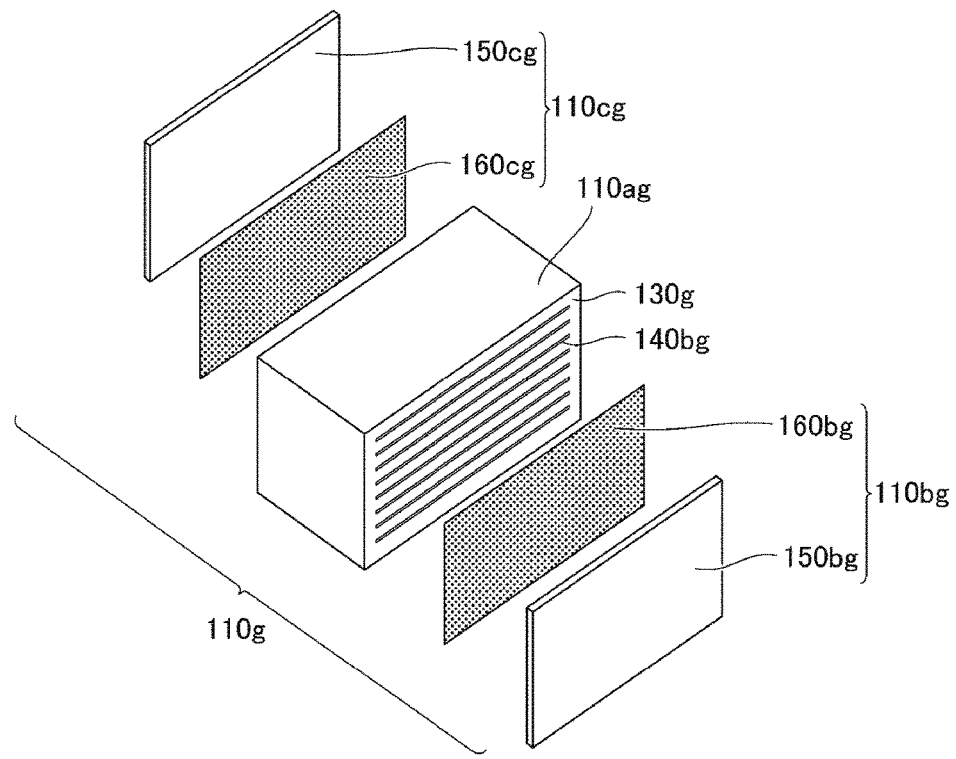
FIG. 10 is an exploded perspective view illustrating the configuration of a coated chip as a laminated body of the ceramic electronic component according to Preferred Embodiment 1 of the present invention.

Next, a coating conductive material is applied to one and the other side surfaces of the chip 110*ag* (step S7). FIG. 10 is an exploded perspective view illustrating the configuration of a coated chip as a laminated body of the ceramic electronic component according to Preferred Embodiment 1 of the present invention.

As shown in FIG. 10, the coating conductive material is applied to one side surface of the chip 110*ag* by a dip method with the use of a mask or various types of printing methods, so as to connect all of the ends of the multiple first conductive patterns 140*bg* to each other, thus forming a first conductive film 160*bg* for the first conductor layer 160*b*. The first conductive film 160*bg* is formed, in a side view, in a rectangular or substantially rectangular shape without reaching any edge of the chip 110*ag*.

The coating conductive material is applied to the other side surface of the chip 110*ag* by a dip method with the use of a mask or various types of printing methods, so as to connect all of the ends of the multiple second conductive patterns 140*cg* to each other, thus forming a second conductive film 160*cg* for the second conductor layer 160*c*. The second conductive film 160*cg* is formed, in a side view, in a rectangular or substantially rectangular shape without reaching any edge of the chip 110*ag*.

According to the present preferred embodiment, at one side surface of the chip 110*ag*, all of the ends of the multiple first conductive patterns 140*bg* are entirely covered with the first conductive film 160*bg*.

However, at one side surface of the chip 110*ag*, at least one end of the multiple first conductive patterns 140*bg* may be partially covered with the first conductive film 160*bg*.

At the other side surface of the chip 110*ag*, all of the ends of the multiple second conductive patterns 140*cg* are entirely covered with the second conductive film 160*cg*. However, at the other side surface of the chip 110*ag*, at least one end of the multiple second conductive patterns 140*cg* may be partially covered with the second conductive film 160*cg*.

Next, coating dielectric sheets are attached to the chip 110*ag* (step S8). As shown in FIG. 10, a first coating dielectric sheet 150*bg* for the first insulating coating layer 150*b* is positioned, and then attached to one side surface of the chip 110*ag*. The first coating dielectric sheet 150*bg* extends from a ridge with the other end surface of the chip 110*ag* toward one end surface thereof, so as to expose a portion of the first conductive film 160*bg* closer to one end of the chip 110*ag*. The first conductive film 160*bg* and the first coating dielectric sheet 150*bg* define a first coating layer 110*bg* for the first coating portion 110*b*.

A second coating dielectric sheet 150*cg* for the second insulating coating layer 150*c* is positioned, and then attached to the other side surface of the chip 110*ag*. The second coating dielectric sheet 150*cg* extends from a ridge with one end surface of the chip 110*ag* toward the other end surface thereof, so as to expose a portion of the second conductive film 160*cg* closer to the other end of the chip 110*ag*. The second conductive film 160*cg* and the second coating dielectric sheet 150*cg* define a second coating layer 110*cg* for the second coating portion 110*c*.

In this regard, a non-limiting example of a method for attaching a coating dielectric sheets to the chip 110*ag* will be described.

Figure 11:
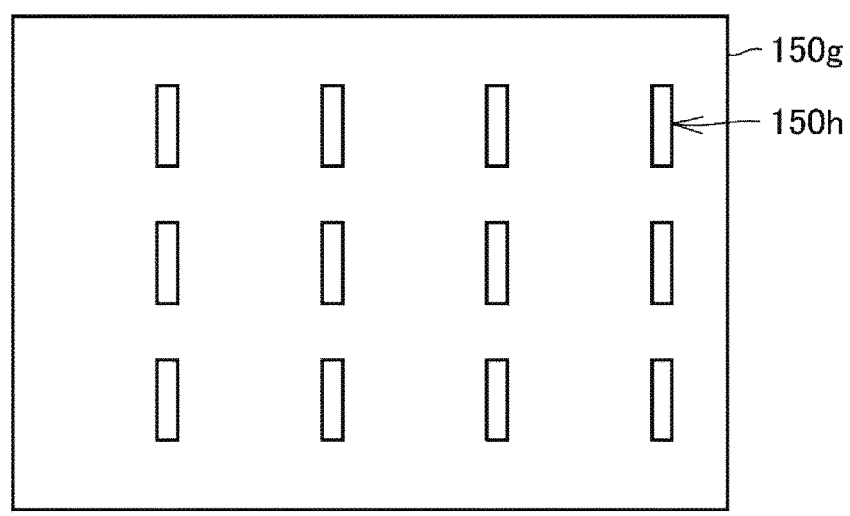
FIG. 11 is a plan view illustrating the appearance of a coating dielectric mother sheet.

FIG. 11 is a plan view illustrating the appearance of a coating dielectric mother sheet. As shown in FIG. 11, a rectangular or substantially rectangular coating dielectric mother sheet 150*g* is provided with a plurality of openings 150*h* in a matrix form. Each of the plurality of openings 150*h* is rectangular or substantially rectangular in a planar view.

Figure 12:
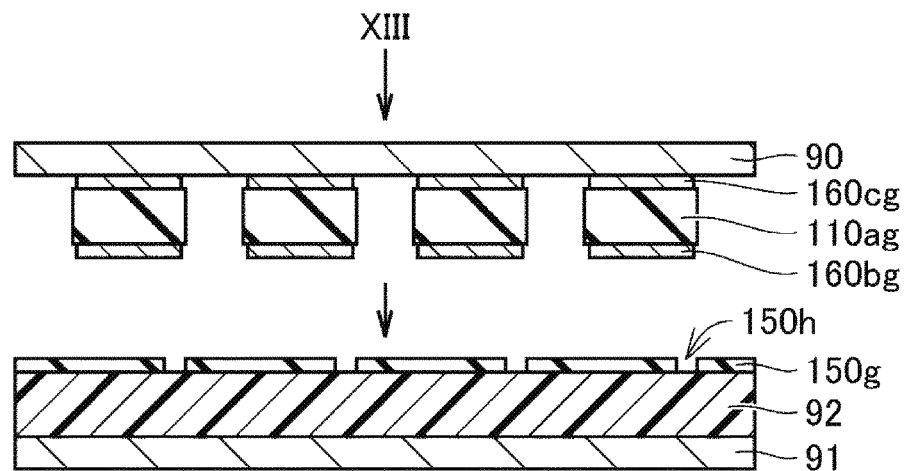
FIG. 12 is a cross-sectional view illustrating a plurality of chips held on a holding plate above a coating dielectric mother sheet placed on an elastic body.
Figure 13:
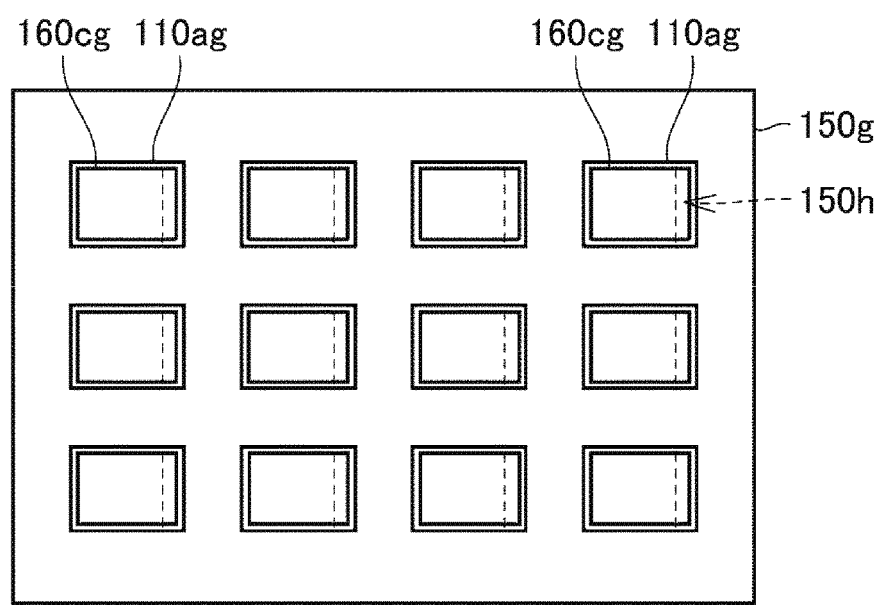
FIG. 13 is a plan view of the condition shown in FIG. 12 from the direction of an arrow XIII.

FIG. 12 is a cross-sectional view illustrating a plurality of chips held on a holding plate above a coating dielectric mother sheet placed on an elastic body. FIG. 13 is a plan view of the condition shown in FIG. 12 from the direction of an arrow XIII. In FIG. 13, the holding plate is not shown.

As shown in FIG. 12, the coating dielectric mother sheet 150*g* is placed on a dielectric body 92. The dielectric body 92 is placed on a table 91.

The plurality of chips 110*ag* arranged at spaced intervals from each other is each adhesively held on a lower surface of the holding plate 90. For example, the plurality of chips 110*ag* is each held on the holding plate 90, with an interposed expanded peel-off sheet, not shown, attached to the lower surface of the holding plate 90. For each of the plurality of chips 110*ag*, the second conductive film 160*cg* provided on the other side surface is brought into the lower surface of the holding plate 90 in a direct or indirect manner.

As shown in FIG. 13, the plurality of chips 110*ag* is positioned each such that a portion of the first conductive film 160*bg* closer to one end of the chip 110*ag* is opposed to the opening 150*h*.

Figure 14:
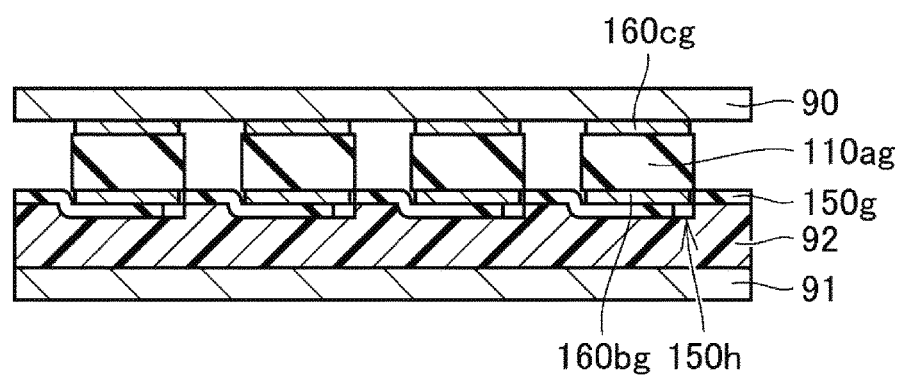
FIG. 14 is a cross-sectional view illustrating the plurality of chips pressed against the coating dielectric mother sheet.

Next, the plurality of chips 110*ag* is each pressed against the coating dielectric mother sheet 150*g* by lowering the holding plate 90. FIG. 14 is a cross-sectional view illustrating the plurality of chips pressed against the coating dielectric mother sheet. As shown in FIG. 14, each of the plurality of chips 110*ag* is pressed against the coating dielectric mother sheet 150*g*, with a pressing force that causes portions of the elastic body 92 in indirect contact with the plurality of chips 110*ag* with the coating dielectric mother sheet 150*g* interposed therebetween to undergo elastic deformations near the respective portions.

Thus, portions of the coating dielectric mother sheet 150*g* sandwiched between the plurality of chips 110*ag* and the dielectric body 92 are each subjected to pressure bonding to one side surface of the plurality of chips 110*ag*. Furthermore, a shear force acts on the coating dielectric mother sheet 150*g* at ridges surrounding one side surface of the plurality of chips 110*ag*, thus punching the coating dielectric mother sheet 150*g*.

Figure 15:
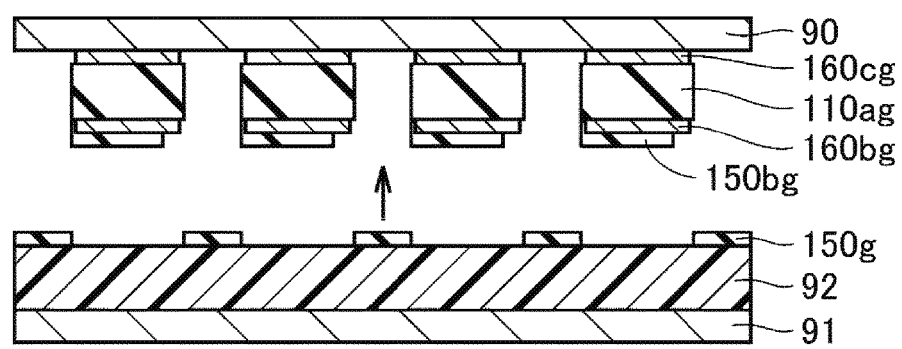
FIG. 15 is a cross-sectional view illustrating the plurality of chips pulled up, from the condition with the chips pressed against the coating dielectric mother sheet.

FIG. 15 is a cross-sectional view illustrating the plurality of chips pulled up, from the condition with the chips pressed against the coating dielectric mother sheet. As shown in FIG. 15, each of the plurality of chips 110*ag* is pulled up from the coating dielectric mother sheet 150*g* by raising the holding plate 90.

In this condition, the first coating dielectric sheet 150*bg* obtained by punching the coating dielectric mother sheet 150*g* is attached to one side surface of the chip 110*ag*. The first coating dielectric sheet 150*bg* is not attached to a portion opposed to the opening 150*h* at one side surface of the chip 110*ag*. Therefore, a portion of the first conductive film 160*bg* opposed to the opening 150*h* is exposed without being covered with the first coating dielectric sheet 150*bg*.

In the same way as mentioned above, the second coating dielectric sheet 150*cg* is able to be positioned, and attached to the other side surface of the chip 110*ag*. Further, in attaching the coating dielectric sheets to the plurality of chips 110*ag*, an adhesive may be applied in advance to at least one of each side surface of the plurality of chips 110*ag* and a main surface of the coating dielectric mother sheet, if necessary.

Next, the coating dielectric sheets are subjected to pressure bonding to the chip, thus forming the coated chip 110*g* (step S9). Specifically, the first coating dielectric sheet 150*bg* and the second coating dielectric sheet 150*cg* are each pressed against to the chip 110*ag* in a heating atmosphere, thus causing the first coating dielectric sheet 150*bg* and the second coating dielectric sheet 150*cg* to undergo thermocompression bonding to the chip 110*ag* to form the coated chip 110*g* shown in FIG. 10.

Next, the coated chip 110*g* is subjected to barrel polishing (step S10). Specifically, the coated chip 110*g* is encapsulated in a small box referred to as a barrel, along with media balls that are higher in hardness than the dielectric material, and the barrel is rotated, thus polishing the coated chip 110*g*. Thus, the coated chip 110*g* have corners and ridges rounded.

Next, the coated chip 110*g* is subjected to firing (step S11). Specifically, the coated chip 110*g* is heated, thus making the dielectric material and conductive material included in the coated chip 110*g* fired, and thus forming the laminated body 110.

Figure 16:
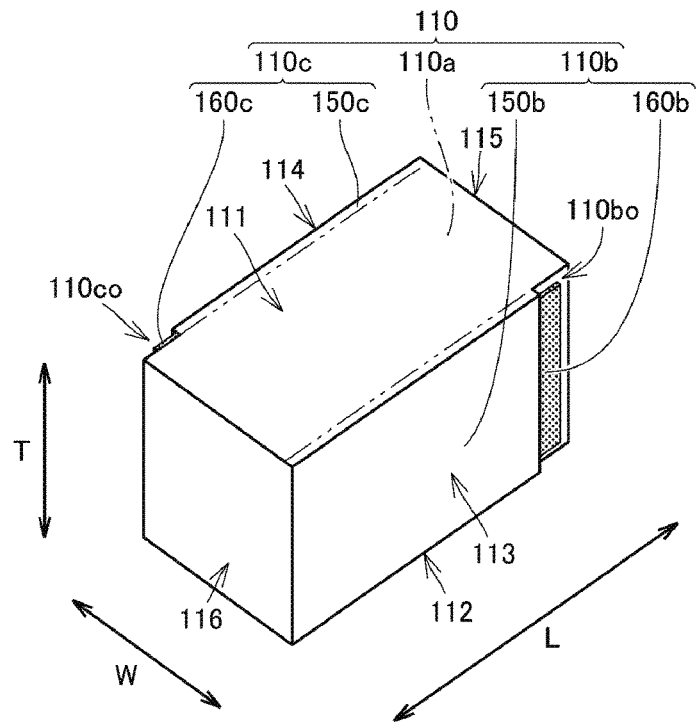
FIG. 16 is a perspective view illustrating the appearance of the laminated body of the multilayer ceramic electronic component according to Preferred Embodiment 1 of the present invention.

FIG. 16 is a perspective view illustrating the appearance of the laminated body of the multilayer ceramic electronic component according to Preferred Embodiment 1 of the present invention. It is to be noted that FIG. 16 shows therein the laminated body 110 with corners and ridges unrounded.

As shown in FIG. 16, in the laminated body 110, the first conductor layer 160*b* is exposed at a first electrode connection portion 110*bo* located adjacent to the first coating portion 110*b* and closer to the first end surface 115. The second conductor layer 160*c* is exposed at a second electrode connection portion 110*co* located adjacent to the second coating portion 110*c* and closer to the second end surface 116.

More specifically, the first insulating coating layer 150*b* is not provided in the location closer to the first end surface 115, but the location serves as the first electrode connection portion 110*bo*. The second insulating coating layer 150*c* is not provided in the location closer to the second end surface 116, but the location serves as the second electrode connection portion 110*co*.

Next, the first external electrode 121 and the second external electrode 122 are formed (step S12). For example, a conductive paste applied to both an end of the laminated body 110 including the first end surface 115 and an end thereof including the second end surface 116 is subjected to firing, thus forming base electrode layers, and the base electrode layers are subjected to Ni plating and Sn plating in this order to form plated layers, thus forming the first external electrode 121 and the second external electrode 122 on the outer surface of the laminated body 110.

At the first side surface 113 of the laminated body 110, the first external electrode 121 is provided to cover the first electrode connection portion 110*bo*, thus coming into contact with the first conductor layer 160*b*. As a result, the first external electrode 121 is electrically connected to each of the multiple first internal electrode layers 140*b*. The surface of a portion of the first external electrode 121 covering the first electrode connection portion 110*bo* is flush or substantially flush with the first side surface 113 of the laminated body 110.

At the second side surface 114 of the laminated body 110, the second external electrode 122 is provided to cover the second electrode connection portion 110*co*, thus coming into contact with the second conductor layer 160*c*. As a result, the second external electrode 122 is electrically connected to each of the multiple second internal electrode layers 140*c*. The surface of a portion of the second external electrode 122 covering the second electrode connection portion 110*co* is flush or substantially flush with the second side surface 114 of the laminated body 110.

The multilayer ceramic electronic component 100 according to Preferred Embodiment 1 of the present invention can be manufactured through the series of steps described above. In the multilayer ceramic electronic component 100 according to Preferred Embodiment 1 of the present invention, the multiple first internal electrode layers 140*b* are each extended to the first side surface 113, and connected to the first conductor layer 160*b*, whereas the multiple second internal electrode layers 140*c* are each extended to the second side surface 114, and connected to the second conductor layer 160*c*. The first conductor layer 160*b* is connected to the first external electrode 121, whereas the second conductor layer 160*c* is connected to the second external electrode 122.

As a result, as compared with a conventional multilayer ceramic electronic component in which each of multiple first internal electrode layers 140*b* extends to a first end surface 115, whereas each of multiple second internal electrode layers 140*c* extends to a second end surface 116, while reducing the equivalent series inductance (ESL) by reducing the loop including the pathway of an electric current that passes through the multilayer ceramic electronic component 100, the pathway of the current is able to be shortened to increase the Q value.

In addition, the first external electrode 121 is provided closer to the first end surface 115, whereas the second external electrode 122 is provided closer to the second end surface 116, thus making it possible to increase the distance between the first external electrode 121 and the second external electrode 122, as compared with a case where the first external electrode 121 is provided closer to the first side surface 113, whereas the second external electrode 122 is provided closer to the second side surface 114. As a result, in the manufacture of the multilayer ceramic electronic component 100, or in the mounting of the multilayer ceramic electronic component 100, short circuits are prevented from being caused between the first external electrode 121 and the second external electrode 122.

Moreover, as mentioned above, the surface of a portion of the first external electrode 121 covering the first electrode connection portion 110bo is preferably flush or substantially flush with the first side surface 113 of the laminated body 110, thus making it possible to reduce the outside width of the first external electrode 121. Likewise, the surface of a portion of the second external electrode 122 covering the second electrode connection portion 110co is flush or substantially flush with the first side surface 114 of the laminated body 110, thus making it possible to reduce the outside width of the second external electrode 122. As a result, when a plurality of multilayer ceramic electronic components 100 is mounted close to each other, at least one of the first external electrodes 121 and second external electrodes 122 of the multilayer ceramic electronic components 100 adjacent to each other are prevented from coming into contact which would cause a short circuit in the circuit.

Preferred Embodiment 2

A multilayer ceramic electronic component according to Preferred Embodiment 2 of present invention will be described below. It is to be noted that the multilayer ceramic electronic component according to Preferred Embodiment 2 of the present invention differs from the multilayer ceramic electronic component 100 according to Preferred Embodiment 1 of the present invention, only in that the first conductor layer and the second conductor layer are not provided, and the description of the same configuration as the multilayer ceramic electronic component 100 according to Preferred Embodiment 1 of the present invention will not be thus repeated.

Figure 17:
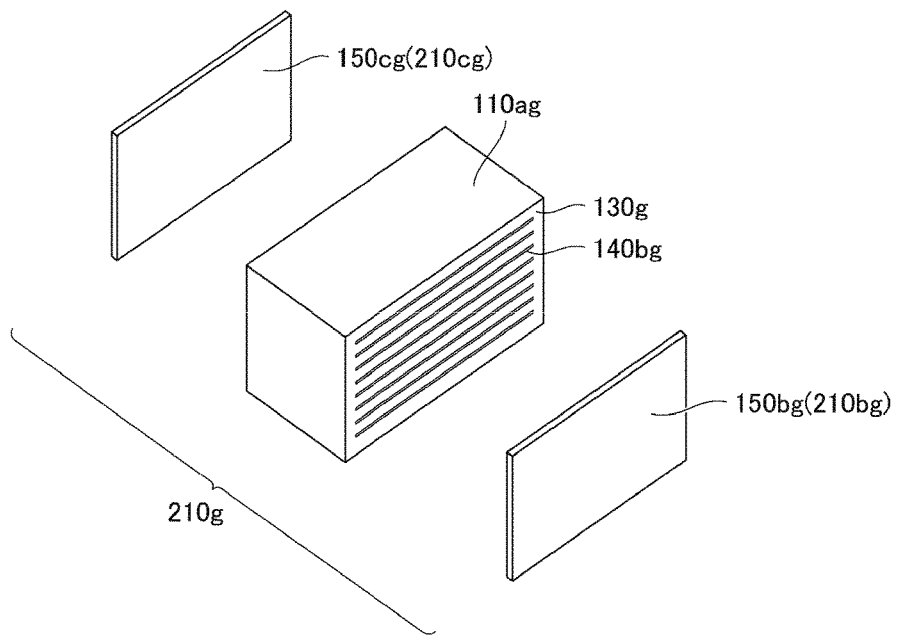
FIG. 17 is an exploded perspective view illustrating the configuration of a coated chip as a laminated body of a multilayer ceramic electronic component according to Preferred Embodiment 2 of the present invention.
Figure 18:
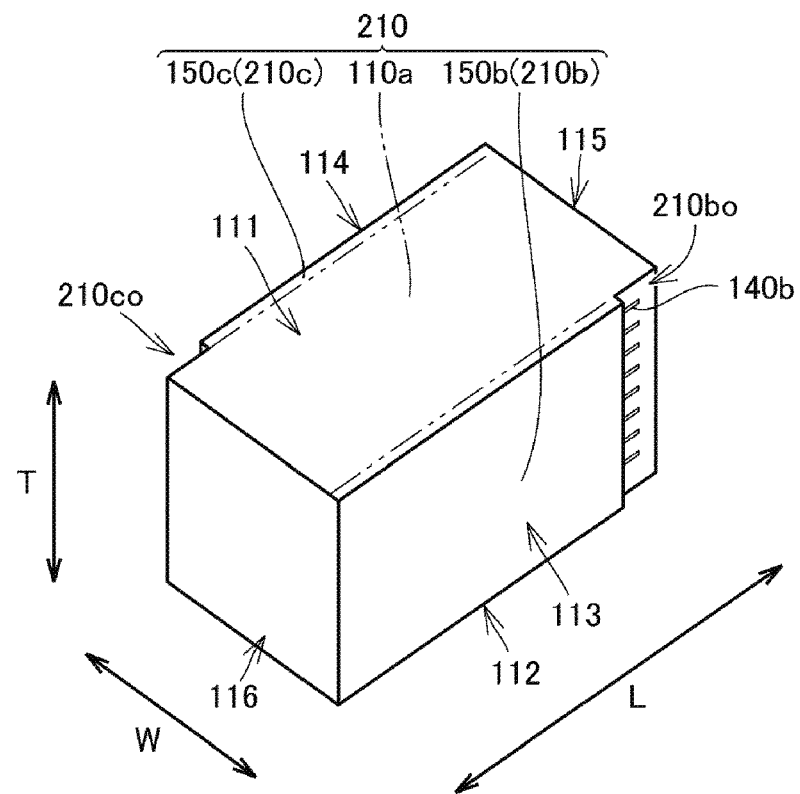
FIG. 18 is a perspective view illustrating the appearance of the laminated body of the multilayer ceramic electronic component according to Preferred Embodiment 2 of the present invention.

FIG. 17 is an exploded perspective view illustrating the configuration of a coated chip as a laminated body of a multilayer ceramic electronic component according to Preferred Embodiment 2 of the present invention. FIG. 18 is a perspective view illustrating the appearance of the laminated body of the multilayer ceramic electronic component according to Preferred Embodiment 2 of the present invention. It is to be noted that FIG. 18 shows therein a laminated body 210 with corners and ridges unrounded.

As shown in FIGS. 17 and 18, the laminated body 210 of the multilayer ceramic electronic component according to Preferred Embodiment 2 of the present invention includes a main portion 110a, a first coating portion 210b that coats one side surface of the main portion 110a to define a first side surface 113, and a second coating portion 210c that coats the other side surface of the main portion 110a to define a second side surface 114.

As shown in FIG. 17, a first coating dielectric sheet 150bg for a first insulating coating layer 150b is positioned, and then attached to one side surface of a chip 110ag. The first coating dielectric sheet 150bg extends from a ridge with the other end surface of the chip 110ag toward one end surface thereof, so as to expose, for each of multiple first conductive patterns 140bg, a portion at an end closer to one side surface of the chip 110ag, closer to one end of the chip 110ag. The first coating dielectric sheet 150bg defines a first coating layer 210bg for the first coating portion 210b.

A second coating dielectric sheet 150cg for the second insulating coating layer 150c is positioned, and then attached to the other side surface of the chip 110ag. The second coating dielectric sheet 150cg extends from a ridge with one end surface of the chip 110ag toward the other end surface thereof, so as to expose, for each of multiple second conductive patterns 140cg, a portion at an end closer to the other side surface of the chip 110ag, closer to the other end of the chip 110ag. The second coating dielectric sheet 150cg defines a second coating layer 210cg for the second coating portion 210c.

The first coating dielectric sheet 150bg and the second coating dielectric sheet 150cg are each pressed against to the chip 110ag in a heating atmosphere, thus causing the first coating dielectric sheet 150bg and the second coating dielectric sheet 150cg to undergo thermocompression bonding to the chip 110ag to provide a coated chip 210g shown in FIG. 17. Next, the coated chip 210g is subjected to barrel polishing and firing, thus providing a laminated body 210.

As shown in FIG. 18, in the laminated body 210, multiple first internal electrode layers 140b are exposed at a first electrode connection portion 210bo located adjacent to the first coating portion 210b and closer to a first end surface 115. Multiple second internal electrode layers 140c are exposed at a second electrode connection portion 210co located adjacent to the second coating portion 210c and closer to a second end surface 116.

More specifically, the first insulating coating layer 150b is not provided in the location closer to the first end surface 115, but the location serves as the first electrode connection portion 210bo. The second insulating coating layer 150c is not provided in the location closer to the second end surface 116, but the location serves as the second electrode connection portion 210co.

Next, a first external electrode 121 and a second external electrode 122 are formed. At a first side surface 113 of the laminated body 210, the first external electrode 121 is provided to cover the first electrode connection portion 210bo, thus coming into contact with the multiple first internal electrode layers 140b. As a result, the first external electrode 121 is electrically connected to each of the multiple first internal electrode layers 140b. The surface of a portion of the first external electrode 121 covering the first electrode connection portion 210bo is flush or substantially flush with the first side surface 113 of the laminated body 210.

At a second side surface 114 of the laminated body 210, the second external electrode 122 is provided to cover the second electrode connection portion 210co, thus coming into contact with the multiple second internal electrode layers 140c. As a result, the second external electrode 122 is electrically connected to each of the multiple second internal electrode layers 140c. The surface of a portion of the second external electrode 122 covering the second electrode connection portion 210co is flush or substantially flush with the second side surface 114 of the laminated body 210.

The entire end closer to the first side surface 113 for each of the multiple first internal electrode layers 140b is covered with the first insulating coating layer 150b and the first external electrode 121. Specifically, a portion closer to the first end surface 115 at the end closer to the first side surface 113 for each of the multiple first internal electrode layers 140b is covered with the first external electrode 121. The rest other than the portion at the end closer to the first side surface 113 for each of the multiple first internal electrode layers 140b is covered with the first insulating coating layer 150b.

The entire end closer to the second side surface 114 for each of the multiple second internal electrode layers 140c is covered with the second insulating coating layer 150c and the second external electrode 122. Specifically, a portion closer to the second end surface 116 at the end closer to the second side surface 114 for each of the multiple second internal electrode layers 140c is covered with the second external electrode 122. The rest other than the portion at the end closer to the second side surface 114 for each of the multiple second internal electrode layers 140c is covered with the second insulating coating layer 150c.

In the multilayer ceramic electronic component according to Preferred Embodiment 2 of the present invention, the multiple first internal electrode layers 140b are each extended to the first side surface 113, and connected to the first external electrode 121, whereas the multiple second internal electrode layers 140c are each extended to the second side surface 114, and connected to the second external electrode 122.

As a result, as compared with a conventional multilayer ceramic electronic component where each of multiple first internal electrode layers 140b extends to a first end surface 115, whereas each of multiple second internal electrode layers 140c extends to a second end surface 116, while reducing the equivalent series inductance (ESL) by reducing the loop including the pathway of an electric current that passes through the multilayer ceramic electronic component, the pathway of the current is able to be shortened to increase the Q value.

In addition, the first external electrode 121 is provided closer to the first end surface 115, whereas the second external electrode 122 is provided closer to the second end surface 116, thus making it possible to increase the distance between the first external electrode 121 and the second external electrode 122, as compared with a case where the first external electrode 121 is provided closer to the first side surface 113, whereas the second external electrode 122 is provided closer to the second side surface 114. As a result, in the manufacture of the multilayer ceramic electronic component, or in the mounting of the multilayer ceramic electronic component, short circuits are prevented from being caused between the first external electrode 121 and the second external electrode 122.

Moreover, as mentioned above, the surface of a portion of the first external electrode 121 covering the first electrode connection portion 210bo is flush or substantially flush with the first side surface 113 of the laminated body 210, thus making it possible to reduce the outside width of the first external electrode 121. Likewise, the surface of a portion of the second external electrode 122 covering the second electrode connection portion 210co is flush or substantially flush with the first side surface 114 of the laminated body 210, thus making it possible to reduce the outside width of the second external electrode 122. As a result, when a plurality of multilayer ceramic electronic components are mounted close to each other, at least one of the first external electrodes 121 and second external electrodes 122 of the multilayer ceramic electronic components adjacent to each other are prevented from coming into contact which would cause a short circuit in the circuit.

The multilayer ceramic electronic component according to Preferred Embodiment 2 of the present invention preferably is not provided with the first conductor layer and the second conductor layer, and the outside widths of the first external electrode 121 and second external electrode 122 are able to be thus further reduced as compared with the multilayer ceramic electronic component 100 according to Preferred Embodiment 1 of the present invention.

However, the multilayer ceramic electronic component 100 according to Preferred Embodiment 1 of the present invention is, as compared with the multilayer ceramic electronic component according to Preferred Embodiment 2 of the present invention, improved by providing the first conductor layer 160b and the second conductor layer 160c, in terms of the stability of the electrical connection between each of the multiple first internal electrode layers 140b and the first external electrode 121 and the stability of the electrical connection between each of the multiple second internal electrode layers 140c and the second external electrode 122.

Experimental Examples

For three types of multilayer ceramic electronic components: a multilayer ceramic electronic component according to Example 1 in accordance with the configuration of the multilayer ceramic electronic component according to Preferred Embodiment 1 of the present invention; a multilayer ceramic electronic component according to Example 2 in accordance with the configuration of the multilayer ceramic electronic component according to Preferred Embodiment 2 of the present invention; and a multilayer ceramic electronic component according to a comparative example different from the multilayer ceramic electronic component according to Preferred Embodiment 2 of the present invention only in the first external electrode 121 provided closer to the first side surface 113 and the second external electrode 122 provided closer to the second side surface 114, experimental results of investigating the incidence of short circuit between the external electrodes and the Q value will be described in mounting the multilayer ceramic electronic components onto a mounting board with the use of a solder.

For each of the multilayer ceramic electronic components according to Example 1, Example 2, and the comparative example, the outside dimensions were about 0.4 mm in the length direction L and about 0.2 mm in the width direction W, the electrostatic capacitance was about 3 pF, and the resonance frequency was about 1 GHz. For each of the multilayer ceramic electronic components according to Example 1, Example 2, and the comparative example, fifty samples were prepared, and the average values were calculated for the incidence of short circuiting between the external electrodes and the Q value.

TABLE 1

| | Incidence of Short Circuit between External Electrodes | Q value |
|---|---|---|
| Example 1 | 0/50 | 550 |
| Example 2 | 0/50 | 600 |
| Comparative Example | 7/50 | 690 |

Table 1 is a table of the experimental results summarized. As shown in Table 1, the incidence of short circuit between the external electrodes was 0/50 in Example 1, 0/50 in Example 2, and 7/50 in the comparative example. The Q value was 550 in Example 1, 600 in Example 2, and 690 in the comparative example.

From the experimental results, it has been successfully confirmed that the incidence of short circuits between the external electrodes is significantly reduced in the multilayer ceramic electronic components according to Example 1 and Example 2, as compared with the multilayer ceramic electronic component according to the comparative example. As for the Q value, it has been successfully confirmed that the multilayer ceramic electronic components according to Example 1 and Example 2 have large values although the values are slightly lower as compared with the multilayer ceramic electronic component according to the comparative example.

Reference Preferred Embodiment

A multilayer ceramic electronic component and a manufacturing method therefor according to a reference preferred embodiment will be described below such that when a plurality of multilayer ceramic electronic components are mounted close to each other with reduced outside widths of external electrodes, external electrodes of the multilayer ceramic electronic components adjacent to each other are prevented from coming into contact, thus causing short circuit in the circuit. It is to be noted that the multilayer ceramic electronic component according to the reference preferred embodiment differs from the multilayer ceramic electronic component according to Preferred Embodiment 2, mainly in that: each of multiple first internal electrode layers is extended to a first end surface; each of multiple second internal electrode layers is extended to a second end surface; and a first coating portion and a second coating portion are provided only on a central portion of a laminated body in the length direction, and the description of the same configuration as the multilayer ceramic electronic component according to Preferred Embodiment 2 will not be thus repeated.

Figure 19:
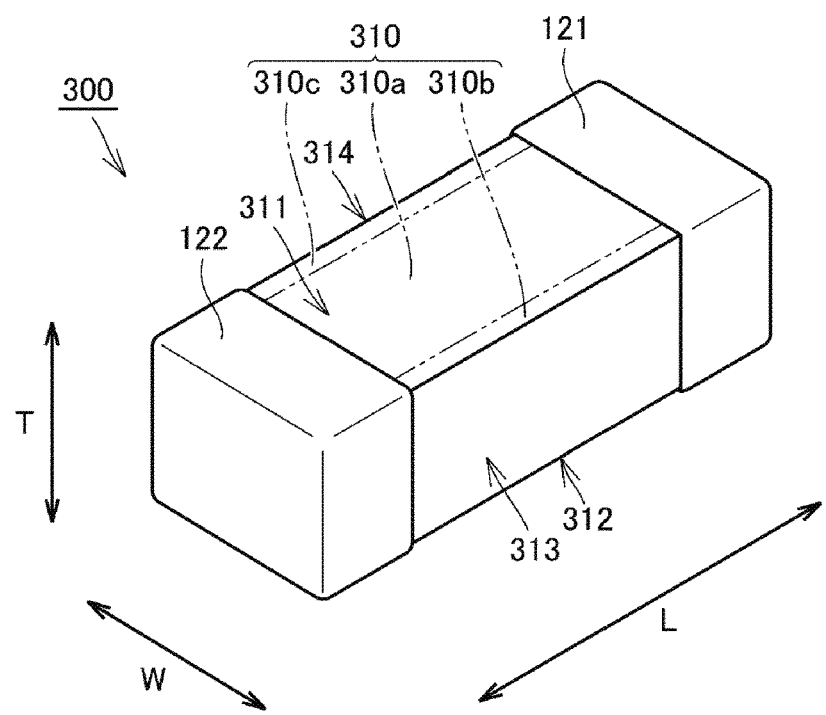
FIG. 19 is a perspective view illustrating the appearance of a multilayer ceramic electronic component according to a reference preferred embodiment of the present invention.

FIG. 19 is a perspective view illustrating the appearance of the multilayer ceramic electronic component according to the reference preferred embodiment. As shown in FIG. 19, the multilayer ceramic electronic component 300 according to the reference preferred embodiment includes a laminated body 310, a first external electrode 121, and a second external electrode 122.

The laminated body 310 includes multiple dielectric layers and multiple internal electrode layers laminated. The laminated body 310 includes a first principal surface 311 and a second principal surface 312 opposed in the laminating direction T, a first side surface 313 and a second side surface 314 opposed in the width direction W perpendicular or substantially perpendicular to the laminating direction T, and a first end surface 315 and a second end surface 316 opposed in the length direction L perpendicular or substantially perpendicular to both the laminating direction T and the width direction W.

The laminated body 310 includes a main portion 310a, a first coating portion 310b that coats one side surface of the main portion 310a to define the first side surface 313, and a second coating portion 310c that coats the other side surface of the main portion 310a to define the second side surface 314.

Figure 20:
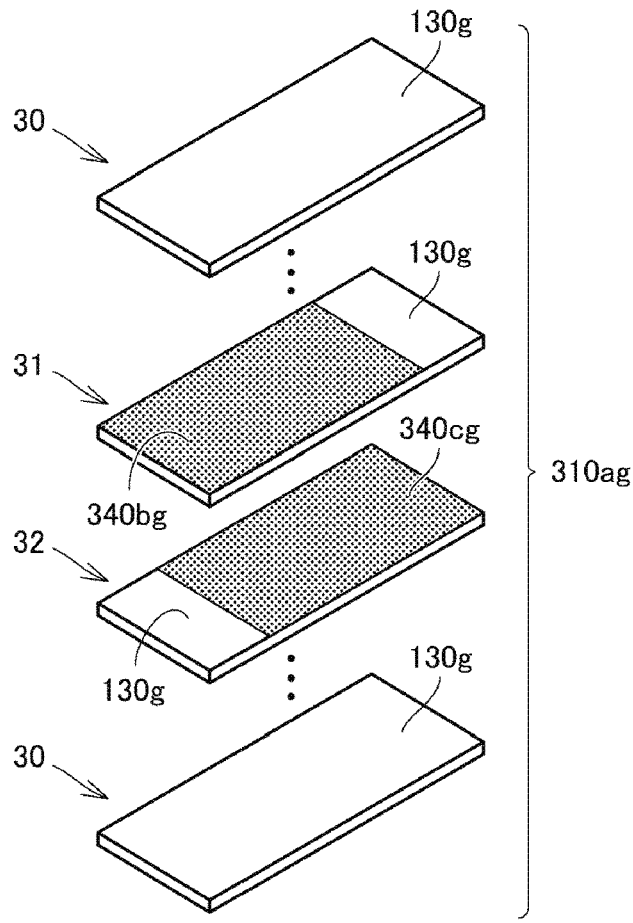
FIG. 20 is an exploded perspective view illustrating the laminated structure a chip as a main portion of the ceramic electronic component according to the reference preferred embodiment of the present invention.

FIG. 20 is an exploded perspective view illustrating the laminated structure a chip as a main portion of the ceramic electronic component according to the reference preferred embodiment. FIG. 20 shows therein only a portion corresponding to one chip 310ag in a group of mother sheets according to the reference preferred embodiment.

As shown in FIG. 20, multiple mother sheets 30, 31, 32 are stacked for forming the chip 310ag. Specifically, a predetermined number of mother sheets 30 is stacked which are each composed of only a dielectric green sheet 130g without any conductive pattern formed thereon. The mother sheets 32 that each include a second conductive pattern 340cg in a matrix form on a dielectric green sheet 130g, and the mother sheets 31 that each include a first conductive pattern 340bg in a matrix form on a dielectric green sheet 130g are alternately formed thereon to reach predetermined numbers of sheets. Furthermore, a predetermined number of mother sheets 30 is stacked thereon which are each composed of only a dielectric green sheet 130g without any conductive pattern formed thereon. Thus, a group of mother sheets is configured.

Figure 21:
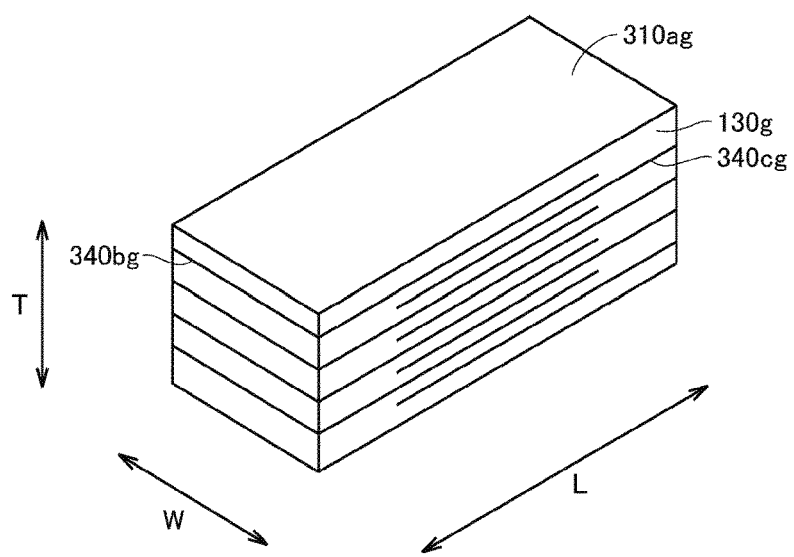
FIG. 21 is a perspective view illustrating the appearance of the chip as a main portion of the ceramic electronic component according to the reference preferred embodiment of the present invention.

Next, the group of mother sheets is subjected to pressure bonding, thus forming a dielectric block. FIG. 21 is a perspective view illustrating the appearance of the chip as a main portion of the ceramic electronic component according to the reference preferred embodiment. The dielectric block is divided to form a chip 310ag as shown in FIG. 21.

In the step mentioned above, the dielectric block is cut such that the first conductive patterns 340bg have ends exposed at each of one and the other side surfaces of the chip 310ag and one end surface thereof, whereas the second conductive patterns 340cg have ends exposed at each of one and the other side surfaces of the chip 310ag and the other end surface thereof.

Figure 22:
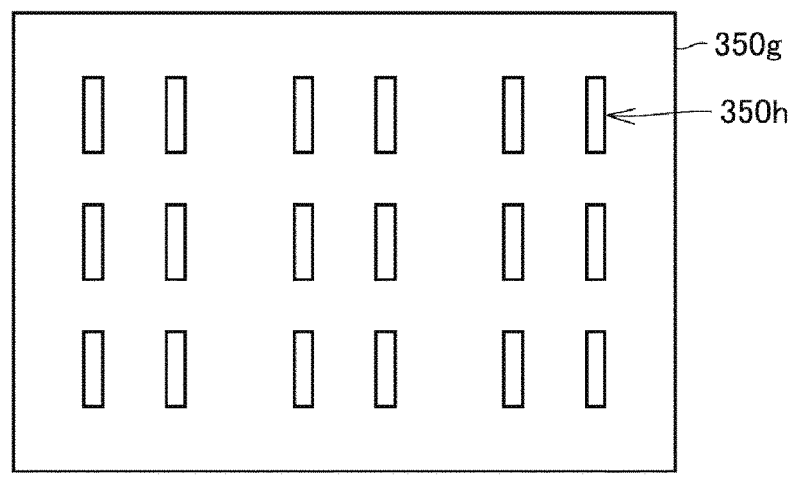
FIG. 22 is a plan view illustrating the appearance of a coating dielectric mother sheet according to the reference preferred embodiment of the present invention.
Figure 23:
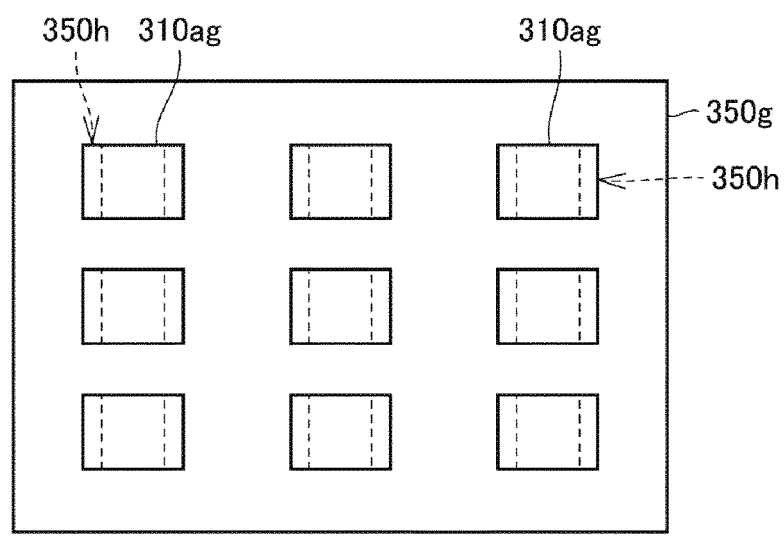
FIG. 23 is a plan view of a plurality of chips held on a holding plate above a coating dielectric mother sheet placed on an elastic body, according to the reference preferred embodiment of the present invention, as viewed from above.

Next, coating dielectric sheets are attached to the chip 310ag. FIG. 22 is a plan view illustrating the appearance of a coating dielectric mother sheet according to the reference preferred embodiment. As shown in FIG. 22, a rectangular or substantially rectangular coating dielectric mother sheet 350g is provided with a plurality of openings 350h in a matrix form. Each of the plurality of openings 350h is rectangular or substantially rectangular in a planar view. FIG. 23 is a plan view of a plurality of chips held on a holding plate above a coating dielectric mother sheet placed on an elastic body, according to the reference preferred embodiment, as viewed from above. In FIG. 23, the elastic body and the holding plate are not shown, as viewed from the same direction as in FIG. 13.

As shown in FIGS. 22 and 23, the coating dielectric mother sheet 350g is placed on the dielectric body. Each of the plurality of chips 310ag at spaced intervals from each other is adhesively held on a lower surface of the holding plate. For example, each of the plurality of chips 310ag is held on the holding plate, with an interposed expanded peel-off sheet, not shown, attached to the lower surface of the holding plate. For each of the plurality of chips 310ag, the other side surface is brought into the lower surface of the holding plate in a direct or indirect manner.

As shown in FIG. 23, each of the plurality of chips 310ag is positioned such that both ends of one side surface of the chip 310ag are opposed to the opening 350h.

Next, each of the plurality of chips 310ag is pressed against the coating dielectric mother sheet 350g by lowering the holding plate. Each of the plurality of chips 310ag is pressed against the coating dielectric mother sheet 350g, with a pressing force that causes portions of the elastic body in indirect contact with the plurality of chips 310ag with the coating dielectric mother sheet 350g interposed therebetween to undergo elastic deformations near the respective portions.

Thus, portions of the coating dielectric mother sheet 350g sandwiched between the plurality of chips 310ag and the dielectric body are each subjected to pressure bonding to one side surface of the plurality of chips 310ag. Furthermore, a shear force acts on the coating dielectric mother sheet 350g at ridges surrounding one side surface of the plurality of chips 310ag, thus punching the coating dielectric mother sheet 350g. Each of the plurality of chips 310ag is pulled up from the coating dielectric mother sheet 350g by raising the holding plate.

Figure 24:
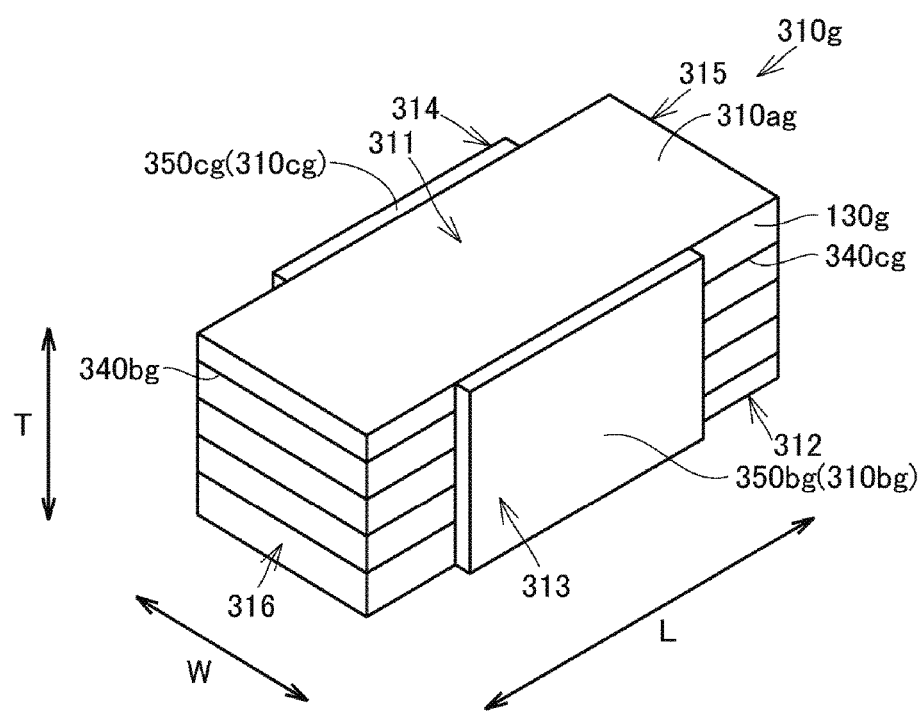
FIG. 24 is a perspective view illustrating the appearance of a coated chip as a laminated body of the ceramic electronic component according to the reference preferred embodiment of the present invention.

FIG. 24 is a perspective view illustrating the appearance of a coated chip as a laminated body of the ceramic electronic component according to the reference preferred embodiment.

As shown in FIG. 24, the first coating dielectric sheet 350bg obtained by punching the coating dielectric mother sheet 350g is attached to one side surface of the chip 310ag. The first coating dielectric sheet 350bg defines a first coating layer 310bg for the first coating portion 310b. The first coating dielectric sheet 350bg is not attached to a portion opposed to the opening 350h at one side surface of the chip 310ag. Therefore, for each of the multiple first conductive patterns 340bg and multiple second conductive patterns 340cg, a portion opposed to the opening 350h is exposed without being covered with the first coating dielectric sheet 350bg.

In the same way as mentioned above, the second coating dielectric sheet 350cg is able to be positioned, and attached to the other side surface of the chip 310ag. The second coating dielectric sheet 350cg defines a second coating layer 310cg for the second coating portion 310c.

Further, in attaching the coating dielectric sheets to the plurality of chips 310ag, an adhesive may be applied in advance to at least one of each side surface of the plurality of chips 310ag and a main surface of the coating dielectric mother sheet, if necessary.

Next, the coating dielectric sheets are subjected to pressure bonding to the chip, thus forming the coated chip 310g. Specifically, the first coating dielectric sheet 350bg and the second coating dielectric sheet 350cg are each pressed against to the chip 310ag in a heating atmosphere, thus causing the first coating dielectric sheet 350bg and the second coating dielectric sheet 350cg to undergo thermocompression bonding to the chip 310ag to form the coated chip 310g shown in FIG. 24.

Next, the coated chip 310g is subjected to barrel polishing and firing, thus forming the laminated body 310.

Next, a first external electrode 121 and a second external electrode 122 are formed. For example, a conductive paste applied to both an end of the laminated body 310 including the first end surface 315 and an end thereof including the second end surface 316 is subjected to firing, thus forming base electrode layers, and the base electrode layers are subjected to Ni plating and Sn plating in this order to form plated layers, thus forming the first external electrode 121 and the second external electrode 122 on the outer surface of the laminated body 310.

The first external electrode 121 is electrically connected to each of the multiple first internal electrode layers. The second external electrode 122 is electrically connected to each of the multiple second internal electrode layers. The outer surface of a portion covering one side surface of the main portion 310a for each of the first external electrode 121 and second external electrode 122 is flush or substantially flush with the first side surface 313 of the laminated body 310, whereas the outer surface of a portion covering the other side surface of the main portion 310a for each of the first external electrode 121 and second external electrode 122 is flush or substantially flush with the second side surface 314 of the laminated body 310.

The multilayer ceramic electronic component 300 according to the reference preferred embodiment as shown in FIG. 19 can be manufactured through the series of steps described above. In the multilayer ceramic electronic component 300 according to the reference preferred embodiment, the outer surface of a portion covering one side surface of the main portion 310a for each of the first external electrode 121 and second external electrode 122 is flush or substantially flush with the first side surface 313 of the laminated body 310, whereas the outer surface of a portion covering the other side surface of the main portion 310a for each of the first external electrode 121 and second external electrode 122 is flush or substantially flush with the second side surface 314 of the laminated body 310. Thus, the outside widths of the first external electrode 121 and second external electrode 122 are able to be reduced.

As a result, when a plurality of multilayer ceramic electronic components 300 are mounted close to each other, at least one of the first external electrodes 121 and second external electrodes 122 of the multilayer ceramic electronic components 300 adjacent to each other are prevented from coming into contact which would cause a circuit in the circuit.

In the methods for manufacturing each of the multilayer ceramic electronic components according to Preferred Embodiment 1 and Preferred Embodiment 2 of the present invention and the reference preferred embodiment, the coating dielectric sheet can be attached only partially to side surfaces of the chips by positioning the chips with respect to, and pressing the chips against the coating dielectric mother sheet provided with the openings. Thus, the conductor layers or internal electrode layers covered with the coating dielectric sheet can be only partially exposed, and connected to the external electrode. As a result, the width of the external electrode is able to be reduced while ensuring the electrical connection between each of the multiple internal electrodes and the external electrode. Therefore, multilayer ceramic electronic components available for high-density arrangements are able to be manufactured while external electrodes that are small in width preferably are formed by a dip method or the like, thus maintaining the production efficiency.

In the descriptions of the preferred embodiments described above, the configurations which can be combined may be combined with each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a laminated body including multiple dielectric layers and multiple internal electrode layers laminated, and a first principal surface and a second principal surface opposed in a laminating direction, a first side surface and a second side surface opposed in a width direction perpendicular or substantially perpendicular to the laminating direction, and a first end surface and a second end surface opposed in a length direction perpendicular or substantially perpendicular to both the laminating direction and the width direction;
a first external electrode provided on the first end surface; and
a second external electrode provided on the second end surface; wherein
the multiple internal electrode layers include multiple first internal electrode layers electrically connected to the first external electrode, and multiple second internal electrode layers electrically connected to the second external electrode;

the laminated body further includes:
- a first conductor layer extending along the first side surface and connected to respective ends of the multiple first internal electrode layers at a surface adjacent to the first side surface to connect the multiple first internal electrode layers to each other;
- a first insulating coating layer covering a surface of the first conductor layer which is opposite to a surface of the first conductor layer connected to the multiple first internal electrode layers to define the first side surface;
- a surface of the first conductor layer adjacent to the first end surface being partially connected to the first external electrode;
- a second conductor layer extending along the second side surface and connected to respective ends of multiple second internal electrode layers at a surface adjacent to the second side surface to connect the multiple second internal electrode layers to each other;
- a second insulating coating layer covering a surface of the second conductor layer which is opposite to the surface of the second conductor layer connected to the multiple second internal electrode layers to define the second side surface; and
- a surface of the second conductor layer adjacent to the second end surface being partially connected to the second external electrode.

2. The multilayer ceramic electronic component according to claim 1, wherein the multilayer ceramic electronic component has a dimension of about 0.48 mm or less in the length direction, and a dimension of about 0.24 mm or less in the width direction.

3. The multilayer ceramic electronic component according to claim 1, wherein
the surface of the first conductor layer adjacent to the first end surface is partially covered with the first external electrode;
a remaining portion of the surface of the first conductor layer not covered with the first external electrode is covered with the first insulating coating layer;
the surface of the second conductor layer adjacent to the second end surface is partially covered with the second external electrode; and
a remaining portion of the surface of the second conductor layer not covered with the second external electrode is covered with the second insulating coating layer.

4. The multilayer ceramic electronic component according to claim 1, wherein the first conductor layer and the second conductor layer each include at least one metal selected from the group consisting of Ni, Cu, Ag, and Pd, or an alloy comprising the one metal.

5. The multilayer ceramic electronic component according to claim 1, wherein the laminated body has a cuboid or substantially cuboid shape and corners and ridges of the laminated body are rounded.

6. The multilayer ceramic electronic component according to claim 1, wherein
the first external electrode extends over each of the first end surface, the first principal surface, the second principal surface, the first side surface, and the second side surface of the laminated body; and
the second external electrode extends over each of the second end surface, the first principal surface, the second principal surface, the first side surface, and the second side surface of the laminated body.

7. The multilayer ceramic electronic component according to claim 1, wherein the first external electrode and the second external electrode each include a base electrode layer, and a plated layer disposed on the base electrode layer.

8. The multilayer ceramic electronic component according to claim 7, wherein the base electrode layer at least one of a baked layer, a resin layer, and a thin film layer.

9. The multilayer ceramic electronic component according to claim 7, wherein the plated layer a two-layer structure an Ni plated layer and a Sn plated layer provided on the Ni plated layer.

10. The multilayer ceramic electronic component according to claim 1, wherein the multilayer ceramic electronic component is one of a capacitor and an inductor.

11. A multilayer ceramic electronic component comprising:
- a laminated body including multiple dielectric layers and multiple internal electrode layers laminated, and a first principal surface and a second principal surface opposed in a laminating direction, a first side surface and a second side surface opposed in a width direction perpendicular or substantially perpendicular to the laminating direction, and a first end surface and a second end surface opposed in a length direction perpendicular or substantially perpendicular to both the laminating direction and the width direction;
- a first external electrode provided on the first end surface; and
- a second external electrode provided on the second end surface; wherein
the multiple internal electrode layers include multiple first internal electrode layers electrically connected to the first external electrode, and multiple second internal electrode layers electrically connected to the second external electrode, the laminated body further includes:
- a first insulating coating layer covering respective ends of the multiple first internal electrode layers adjacent to the first side surface to define the first side surface;
- a second insulating coating layer covering respective ends of the multiple second internal electrode layers adjacent to the second side surface to define the second side surface; wherein
- a portion of the multiple first internal electrode layers, which is adjacent to the first end surface and extends to the first side surface for each of the multiple first internal electrode layers, being connected to the first external electrode;
- a portion of the multiple second internal electrode layers, which is adjacent to the second end surface and extends to the second side surface for each of the multiple second internal electrode layers, being connected to the second external electrode.

12. The multilayer ceramic electronic component according to claim 11, wherein the multilayer ceramic electronic component has a dimension of about 0.48 mm or less in the length direction, and a dimension of about 0.24 mm or less in the width direction.

13. The multilayer ceramic electronic component according to claim 11, wherein
the portion of the multiple first internal electrode layers, which is adjacent to the first end surface at the respective ends of the multiple first internal electrode layers, is partially covered with the first external electrode;

a remaining portion of each of the multiple first internal electrode layers not covered with the first external electrode is covered with the first insulating coating layer;

the portion of the multiple second internal electrode layers, which is adjacent to the second end surface at the respective ends of the multiple second internal electrode layers, is partially covered with the second external electrode; and a remaining portion of each of the multiple second internal electrode layers not covered with the second external electrode is covered with the second insulating coating layer.

14. The multilayer ceramic electronic component according to claim 11, wherein the multiple internal electrode layers each include at least one metal selected from the group consisting of Ni, Cu, Ag, and Pd, or an alloy comprising the one metal.

15. The multilayer ceramic electronic component according to claim 11, wherein the laminated body has a cuboid or substantially cuboid shape and corners and ridges of the laminated body are rounded.

16. The multilayer ceramic electronic component according to claim 11, wherein the first external electrode extends over each of the first end surface, the first principal surface, the second principal surface, the first side surface, and the second side surface of the laminated body; and the second external electrode extends over each of the second end surface, the first principal surface, the second principal surface, the first side surface, and the second side surface of the laminated body.

17. The multilayer ceramic electronic component according to claim 11, wherein the first external electrode and the second external electrode each include a base electrode layer, and a plated layer disposed on the base electrode layer.

18. The multilayer ceramic electronic component according to claim 17, wherein the base electrode layer at least one of a baked layer, a resin layer, and a thin film layer.

19. The multilayer ceramic electronic component according to claim 17, wherein the plated layer a two-layer structure an Ni plated layer and a Sn plated layer provided on the Ni plated layer.

20. The multilayer ceramic electronic component according to claim 11, wherein the multilayer ceramic electronic component is one of a capacitor and an inductor.

* * * * *